US012621756B2

(12) United States Patent
Wang et al.

(10) Patent No.: US 12,621,756 B2
(45) Date of Patent: May 5, 2026

(54) RADIO ACCESS TECHNOLOGY IDENTIFIERS

(71) Applicant: Google LLC, Mountain View, CA (US)

(72) Inventors: Jibing Wang, San Jose, CA (US); Erik Richard Stauffer, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 594 days.

(21) Appl. No.: 17/996,185

(22) PCT Filed: Mar. 9, 2021

(86) PCT No.: PCT/US2021/021541

§ 371 (c)(1),
(2) Date: Oct. 13, 2022

(87) PCT Pub. No.: WO2021/216211

PCT Pub. Date: Oct. 28, 2021

(65) Prior Publication Data

US 2023/0354170 A1 Nov. 2, 2023

Related U.S. Application Data

(60) Provisional application No. 63/012,555, filed on Apr. 20, 2020.

(51) Int. Cl.
| | |
|---|---|
| *H04W 48/18* | (2009.01) |
| *H04W 72/12* | (2023.01) |
| *H04W 88/06* | (2009.01) |

(52) U.S. Cl.
CPC ....... *H04W 48/18* (2013.01); *H04W 72/1215* (2013.01); *H04W 88/06* (2013.01)

(58) Field of Classification Search
CPC .. H04W 48/18; H04W 72/1215; H04W 88/06
See application file for complete search history.

(56) References Cited

U.S. PATENT DOCUMENTS

| | | | |
|---|---|---|---|
| 8,270,972 B2 | 9/2012 | Otting et al. | |
| 9,338,700 B2 * | 5/2016 | Schulist | ............... H04W 48/18 |

(Continued)

FOREIGN PATENT DOCUMENTS

| | | | |
|---|---|---|---|
| CN | 103858475 A | 6/2014 | |
| CN | 108307382 A * | 7/2018 | ........ H04W 36/0011 |

(Continued)

OTHER PUBLICATIONS

"International Search Report and Written Opinion", PCT Application No. PCT/US2021/021541, Jul. 8, 2021, 11 pages.

(Continued)

*Primary Examiner* — Charles N Appiah
(74) *Attorney, Agent, or Firm* — PATENT PORTFOLIO BUILDERS PLLC

(57) ABSTRACT

Techniques and apparatuses are described for radio access technology identifiers. In aspects, a base station receives air interface resource prospective usage information associated with communications over a first wireless link of at least two wireless links that use different Radio Access Technologies (RATs). The base station then allocates the sharable air interface resource between the at least two wireless links by analyzing the air interface resource prospective usage information. In aspects, the base station transmits a RAT-identifier-presence indicator that communicates a presence of a RAT identifier by indicating one or more downlink air interface resources used to transmit the RAT identifier, where the RAT identifier indicates the allocation of the sharable air interface resource between the at least two wireless links. The base station then transmits the RAT identifier using the one or more downlink air interface resources indicated by the RAT-identifier-presence indicator.

20 Claims, 9 Drawing Sheets

(56) References Cited

U.S. PATENT DOCUMENTS

| | | | | |
|---|---|---|---|---|
| 9,520,980 | B1 * | 12/2016 | Ramamurthy | H04L 5/0058 |
| 10,645,705 | B1 | 5/2020 | Mansour et al. | |
| 10,827,423 | B1 * | 11/2020 | Manganiello | H04W 48/20 |
| 11,943,630 | B2 * | 3/2024 | Kumar | H04W 76/15 |
| 2010/0086072 | A1 | 4/2010 | Mazet et al. | |
| 2010/0260156 | A1 * | 10/2010 | Lee | H04W 56/0035 |
| | | | | 370/336 |
| 2017/0048889 | A1 | 2/2017 | Kadous et al. | |
| 2017/0070967 | A1 * | 3/2017 | Wang | H04W 56/0005 |
| 2018/0375705 | A1 | 12/2018 | Gaal et al. | |
| 2019/0132745 | A1 | 5/2019 | Sun et al. | |
| 2019/0246408 | A1 | 8/2019 | Ngai et al. | |
| 2019/0268924 | A1 * | 8/2019 | Kim | H04W 72/04 |
| 2019/0274121 | A1 | 9/2019 | Wu et al. | |
| 2019/0349991 | A1 * | 11/2019 | Mukherjee | H04L 5/1469 |
| 2019/0380128 | A1 | 12/2019 | Park et al. | |
| 2020/0260415 | A1 * | 8/2020 | Li | H04L 1/1812 |
| 2021/0259010 | A1 * | 8/2021 | Yang | H04W 72/569 |
| 2021/0266753 | A1 * | 8/2021 | Kumar | H04W 28/0252 |
| 2022/0070845 | A1 | 3/2022 | Stauffer et al. | |
| 2024/0040389 | A1 * | 2/2024 | Hosseini | H04W 16/14 |
| 2024/0048996 | A1 * | 2/2024 | Atawia | H04B 7/0452 |

FOREIGN PATENT DOCUMENTS

| | | | | |
|---|---|---|---|---|
| WO | 2007124675 | | 11/2007 | |
| WO | 2017123288 | | 7/2017 | |
| WO | 2018082673 | | 5/2018 | |
| WO | WO-2018130022 | A1 * | 7/2018 | H04W 36/0011 |
| WO | 2020125419 | | 6/2020 | |
| WO | 2021216211 | | 10/2021 | |

OTHER PUBLICATIONS

"International Preliminary Report on Patentability", Application No. PCT/US2021/021541, Oct. 25, 2022, 8 pages.

"Universal Mobile Telecommunications System (UMTS) Numbering, addressing and identification", (3GPP TS 23.003 version 15.4.0 Release 15), Jul. 2018, 119 pages.

Mansouri, et al., "A New Multi-rat Scheduling Algorithm for Heterogeneous Wireless Networks", Mar. 2015, 25 pages.

Chinese Office Action received in corresponding Application No. 202180029622.5, issued Dec. 31, 2024.

* cited by examiner

100

110

130 106

140 120 170 160

102 103

Core Network 150 107 Internet 180

Remote Service(s) 190

KEY

| RAT 1 | |
| RAT 2 | |

Figure 5:
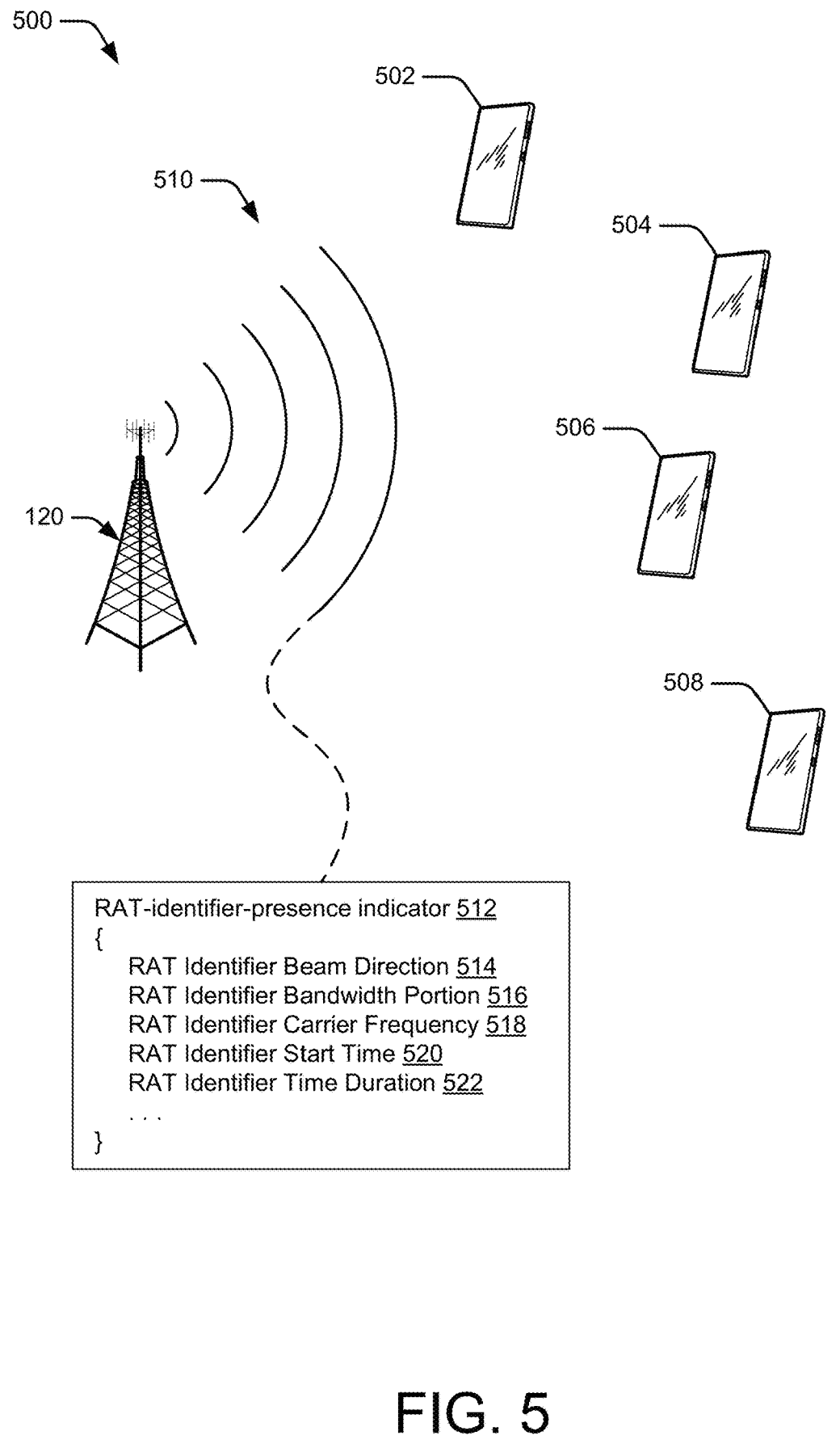

500

502

510

504

506

120

508

RAT-identifier-presence indicator 512
{
    RAT Identifier Beam Direction 514
    RAT Identifier Bandwidth Portion 516
    RAT Identifier Carrier Frequency 518
    RAT Identifier Start Time 520
    RAT Identifier Time Duration 522
    . . .
}

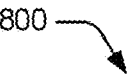

Receive, from a second base station, air interface resource prospective usage information associated with communications over a first wireless link of the at least two wireless links
805

Allocate a sharable air interface resource between at least two wireless links that are implemented using different RATs
810

Transmit a RAT-identifier-presence indicator that communicates a presence of a RAT identifier by indicating one or more downlink air interface resources used to transmit the RAT identifier
815

Transmit the RAT identifier using the one or more downlink air interface resources indicated by the RAT-identifier-presence indicator
820

830

Communicate over a second wireless link of the at least two wireless links using the sharable air interface resource according to the allocation
825

FIG. 8

900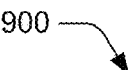

Receive a RAT-identifier-presence indicator that indicates a
presence of a RAT identifier by indicating one or more downlink air
interface resources used to transmit the RAT identifier
905

Receive the RAT identifier according to the
one or more downlink air interface resources
indicated by the RAT-identifier-presence indicator
910

Identify an allocation of the sharable air interface
resource from the RAT identifier
915

925

Communicate over the at least two wireless links by processing the
sharable air interface resource according to the allocation
920

FIG. 9

RADIO ACCESS TECHNOLOGY IDENTIFIERS

RELATED APPLICATION(S)

This application is a national stage entry of International Application No. PCT/US2021/021541, filed Mar. 9, 2021, which claims the benefit of U.S. Provisional Application No. 63/012,555, filed Apr. 20, 2020, the disclosures of which are incorporated herein by reference in their entirety.

BACKGROUND

Evolving wireless communication systems, such as fifth generation (5G) technologies and sixth generation (6G) technologies, use various techniques that increase data capacity relative to preceding wireless networks. As one example, some evolving user equipments (UEs) support simultaneous wireless links to multiple Radio Access Technologies (RATs) to increase the data capacity.

Oftentimes, different RATs utilize different frequency bands, timing relationships, modulation schemes, coding schemes, and so forth. This can disadvantageously increase the cost and size of a UE that supports multiple RATs. To illustrate, a UE that supports two RATs includes a first radio to support a first RAT and a second radio to support the second RAT. As wireless technologies evolve, opportunities emerge to support multiple RATs to obtain the performance benefits (e.g., increased data capacity) while seeking to maintain the cost or size of the corresponding UE.

SUMMARY

This document describes techniques and apparatuses for radio access technology identifiers. In aspects, a base station receives, from a second base station, air interface resource prospective usage information associated with communications over a first wireless link of at least two wireless links that use different Radio Access Technologies (RATs). The base station then allocates the sharable air interface resource between the at least two wireless links by analyzing the air interface resource prospective usage information. In aspects, the base station transmits a RAT-identifier-presence indicator that communicates a presence of a RAT identifier by indicating one or more downlink air interface resources used to transmit the RAT identifier, where the RAT identifier indicates the allocation of the sharable air interface resource between the at least two wireless links. The base station then transmits the RAT identifier using the one or more downlink air interface resources indicated by the RAT-identifier-presence indicator.

In one or more aspects, a UE receives, from a base station, a radio access technology-identifier-presence indicator (RAT-identifier-presence indicator) that indicates a presence of a radio access technology identifier (RAT identifier) by indicating one or more downlink air interface resources used to transmit the RAT identifier. The RAT identifier indicates an allocation of a sharable air interface resource between at least two wireless links that implement different Radio Access Technologies (RATs). The UE then receives the RAT identifier according to the indicated one or more downlink air interface resources and identifies the allocation of the sharable air interface resource from the RAT identifier. In aspects, the UE processes the sharable air interface resource according to the allocation.

The details of one or more implementations of radio access technology identifiers are set forth in the accompanying drawings and the following description. Other features and advantages will be apparent from the description and drawings, and from the claims. This summary is provided to introduce subject matter that is further described in the Detailed Description and Drawings. Accordingly, this summary should not be considered to describe essential features nor used to limit the scope of the claimed subject matter.

BRIEF DESCRIPTION OF THE DRAWINGS

The details of one or more aspects of radio access technology identifiers are described below. The use of the same reference numbers in different instances in the description and the figures indicate similar elements:

FIG. 2 illustrates an example device diagram of network entities that can implement various aspects of radio access technology identifiers.

FIG. 4 illustrates an example environment in accordance with various implementations of radio access technology identifiers.

FIG. 5 illustrates an example environment in accordance with various implementations of radio access technology identifiers.

FIG. 8 illustrates an example method for radio access technology identifiers in accordance with one or more aspects FIG. 9 illustrates an example method for radio access technology identifiers in accordance with one or more aspects.

DETAILED DESCRIPTION

Figure 1:
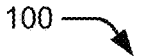
FIG. 1 illustrates an example operating environment in which various aspects of radio access technology identifiers can be implemented.

Evolving wireless communication systems use various techniques to meet usage demands that strain or exceed the capabilities of prior wireless communication systems. As one example, some evolving user equipments (UEs) support simultaneous and/or contemporaneous wireless links to using multiple Radio Access Technologies (RATs) to increase data capacity. To illustrate, a UE operating in 5G non-standalone mode (also known as one type of Multi-RAT Dual Connectivity, MR-DC) increases data capacity by receiving user-plane data over a first wireless link using a first, 4G RAT and a second wireless link using a second, 5G RAT. Oftentimes, the different wireless links implementing the different RATs partition air interface resources (e.g., frequency bands, timing relationships) differently and/or use different signal configurations (e.g., modulation schemes, coding schemes). This disadvantageously increases the cost and size of a UE that supports multiple RATs, such as by including multiple dedicated transceivers in the UE for processing the different air interface resources and/or signal configurations utilized by the wireless links. Sometimes, using the different wireless links with the different air interface resources leads to spectral inefficiency. For example, when there are no active transmissions using a frequency band for a first wireless link, the related radio wastes opportunities to exchange user-plane data and/or control-plane information between devices on that frequency band during those unused time periods.

An alternative to different wireless links utilizing different air interface resources involves apportioning common (sharable) air interface resources (e.g., time durations at particular start times, carrier frequencies, frequency partitions) between the different wireless links. To illustrate, both Wi-Fi 6E and 5G-unlicensed (5G-U) will share 6 GHz spectrum in the United States. Apportioning the air interface resources between the two types of wireless links allows a UE to support the simultaneous and/or contemporaneous wireless links using a single transceiver for the 6 GHz band, which reduces cost and size of the UE. This also improves spectral efficiency by increasing utilization of air interface resources. In other words, unused air interface resources allocated to a first wireless link implementing a first RAT can be used by a second wireless link implementing a second RAT even when the RATs use different frequency and/or timing partitions.

In implementations, a UE processing the signals received using the (apportioned) sharable air interface resources may have difficulty identifying which RAT was used to transmit the signals in the (apportioned) sharable air interface resources at which time, resulting in recovery errors when the UE mistakenly processes signals of a first RAT as signals of a second RAT. Various implementations communicate RAT identifiers that denote, to the UE, which RAT signals occupies the (apportioned) sharable air interface resources and when. The RAT identifiers enable a UE to properly extract (or transmit) information using multiple RATs using a single transceiver, which not only reduces the cost and size of the UE, but additionally improves the efficacy of communications that use the (apportioned) sharable air interface resources.

In aspects, a base station receives, from a second base station, air interface resource prospective usage information associated with communications over a first wireless link of at least two wireless links that use different Radio Access Technologies (RATs). The base station then allocates the sharable air interface resource between the at least two wireless links by analyzing the air interface resource prospective usage information. In aspects, the base station transmits a RAT-identifier-presence indicator that communicates a presence of a RAT identifier by indicating one or more downlink air interface resources used to transmit the RAT identifier, where the RAT identifier indicates the allocation of the sharable air interface resource between the at least two wireless links. The base station then transmits the RAT identifier using the one or more downlink air interface resources indicated by the RAT-identifier-presence indicator.

In one or more aspects, a UE receives, from a base station, a radio access technology-identifier-presence indicator (RAT-identifier-presence indicator) that indicates a presence of a radio access technology identifier (RAT identifier) at one or more downlink air interface resources used to transmit the RAT identifier. The RAT identifier indicates an allocation of a sharable air interface resource between at least two wireless links that implement different Radio Access Technologies (RATs). The UE then receives the RAT identifier according to the indicated one or more downlink air interface resources and identifies the allocation of the sharable air interface resource for each RAT from the RAT identifier. In aspects, the UE processes the sharable air interface resource according to the allocation.

Example Environments

FIG. 1 illustrates an example environment 100, which includes a user equipment 110 (UE 110). The UE 110 can communicate with a base station 120 through a wireless communication link 130. For simplicity, the UE 110 is implemented as a smartphone but may be implemented as any suitable computing or electronic device, such as a mobile communication device, modem, cellular phone, gaming device, navigation device, media device, laptop computer, desktop computer, tablet computer, smart appliance, vehicle-based communication system, or an Internet-of-Things (IoT) device such as a sensor or an actuator. The base station 120 (e.g., an Evolved Universal Terrestrial Radio Access Network Node B, E-UTRAN Node B, evolved Node B, eNodeB, eNB, Next Generation Node B, gNode B, gNB, ng-eNB, WLAN access point, or the like) may be implemented in a macrocell, microcell, small cell, picocell, distributed base station, or the like, or any combination or future evolution thereof.

The base station 120 communicates with the UE 110 using the wireless link 130, which may be implemented as any suitable type of wireless link. The wireless link 130 includes control and data communication, such as downlink of data and control information communicated from the base station 120 to the UE 110, uplink of other data and control information communicated from the UE 110 to the base station 120, or both. The wireless link 130 may include one or more wireless links (e.g., radio links) or bearers implemented using any suitable communication protocol or standard, or combination of communication protocols or standards, such as 3rd Generation Partnership Project Long-Term Evolution (3GPP LTE), Fifth Generation New Radio (5G NR), Wi-Fi 6E, and so forth. Multiple wireless links 130 may be aggregated in a carrier aggregation or multi-connectivity to provide a higher data rate for the UE 110. Multiple wireless links 130 from multiple base stations 120 may be configured for Coordinated Multipoint (CoMP) communication with the UE 110.

The base station 120 is included in a Radio Access Network 140 (e.g., RAN, 5G NR RAN, or NR RAN). In the environment 100, the base station 120 connects to a core network 150 at 102, such as through an NG2 interface for control-plane signaling and an NG3 interface for user-plane data communications. In other aspects, the base station 120 connects, at 102, to the core network 150 using an Si interface for control-plane signaling and user-plane data communications. The base station 120 also implements one or more RATs, such as an Evolved Universal Mobile Telecommunications Systems (UMTS) Terrestrial Radio Access Technology (E-UTRA, 4G RAT), a New Radio-Radio Access Technology (NR RAT, 5G RAT), and/or a 6th Generation (6G) RAT.

In aspects, a base station that implements a RAT includes support for licensed and/or unlicensed spectrum access as defined by the RAT. For example, 5G RAT licensed access utilizes a first frequency spectrum allocated to 5G communications. Alternatively, or additionally, the 5G RAT supports unlicensed access (e.g., 5G-U) that utilizes a second frequency spectrum allocated for unlicensed/license-free access. In aspects, the licensed access and unlicensed access have variations in channel access requirements (e.g., variations in message handshaking or signaling handshaking)

from one another as defined by the RAT. Thus, a base station that supports the RAT can include support for licensed and unlicensed frequency access.

The core network 150 connects to the Internet 180 at 107 and includes entities and/or functions to support access and mobility for the UE 110. The core network 150 also includes entities, functions, and/or gateways that support connectivity to the Internet 180 and remote service(s) 190.

The UE 110 can also maintain a second connection, labeled as wireless local-area-network (WLAN) wireless link 106 to a second base station, labeled as WLAN access point (AP) 160. The WLAN AP 160 connects to the Internet 180 through one or more network interfaces 103. In various aspects, the WLAN AP 160 corresponds to a Wi-Fi 6E AP that implements the WLAN wireless link 106 using a different RAT than a RAT implemented by the base station 120 to maintain the wireless link 130. The WLAN AP 160 may be located in a user's home, an office, airport, coffee shop, and so forth. In aspects, the WLAN AP 160 may be independently operated, such as in a user's home, or may be part of a WLAN network 170. For example, a WLAN network 170 may be an enterprise network or a public network of WLAN APs 160 operated by a wireless network operator. The WLAN wireless network operator may be the same as the operator of the RAN 140 or different than the operator of the RAN 140. This WLAN AP 160 base station implementation may be replaced by a second cellular base station implementing a different cellular RAT than the first base station 120 and indirectly connected to the internet 180. These teachings can apply regardless of the type of wireless access device using the second RAT as will be shown in future drawings.

The base station 120 and the WLAN AP 160 communicate with the UE 110 over the wireless link 130 and the wireless link 106, respectively, using one or more sharable air interface resources. As one example, the base station 120 and the WLAN AP 160 apportion a carrier frequency between one another. To indicate to the UE 110 which RAT transmissions occupy which portions of the carrier frequency (and when), the base station 120 and/or the WLAN AP 160 indicate a RAT identifier to the UE 110, where the RAT identifier indicates various types of information to the UE, such as an assigned RAT, an assigned-RAT start time, an assigned-RAT time duration, an assigned-RAT frequency partition, or an assigned-RAT carrier-frequency. As a simplified example, the RAT identifier(s) indicate when a first RAT transmission (e.g., 5G RAT as supported by base station 120) utilizes the carrier frequency and when a second RAT transmission (e.g., Wi-Fi 6E supported by the WLAN AP 160) utilizes the carrier frequency. The UE 110 then extracts the information from the RAT identifier and uses the information to determine how to process signals transmitted using the carrier frequency using the corresponding RAT.

In aspects, the base station 120 and/or the WLAN AP 160 transmit a RAT-identifier-presence indicator to communicate a presence of the RAT identifier (e.g., when and where to locate a RAT identifier). To illustrate, assume a first RAT implemented by the base station 120 uses different timing partitions relative to the timing partitions used by a second RAT implemented by the WLAN AP 160. The asynchronous timing partitions between RATs make the recovery of a transmitted RAT identifier difficult for the UE 110 since the different RAT transmissions are not time-aligned. To indicate to the UE 110 a presence of a RAT identifier, the base station 120 and/or the WLAN AP 160 transmit a RAT-identifier-presence indicator that indicates downlink air interface resources used to transmit the RAT identifier. To illustrate, the base station 120 and/or WLAN AP 160 broadcasts the RAT-identifier-presence indicator to UEs within range, such that the UEs successfully receive and process the RAT-identifier-presence indicator and, subsequently, can determine how to receive and process the RAT identifier. In other implementations, the base station 120 transmits the RAT-identifier-presence indicator using a radio resource control (RRC) message directed to a specific UE.

Example Devices

Figure 2:
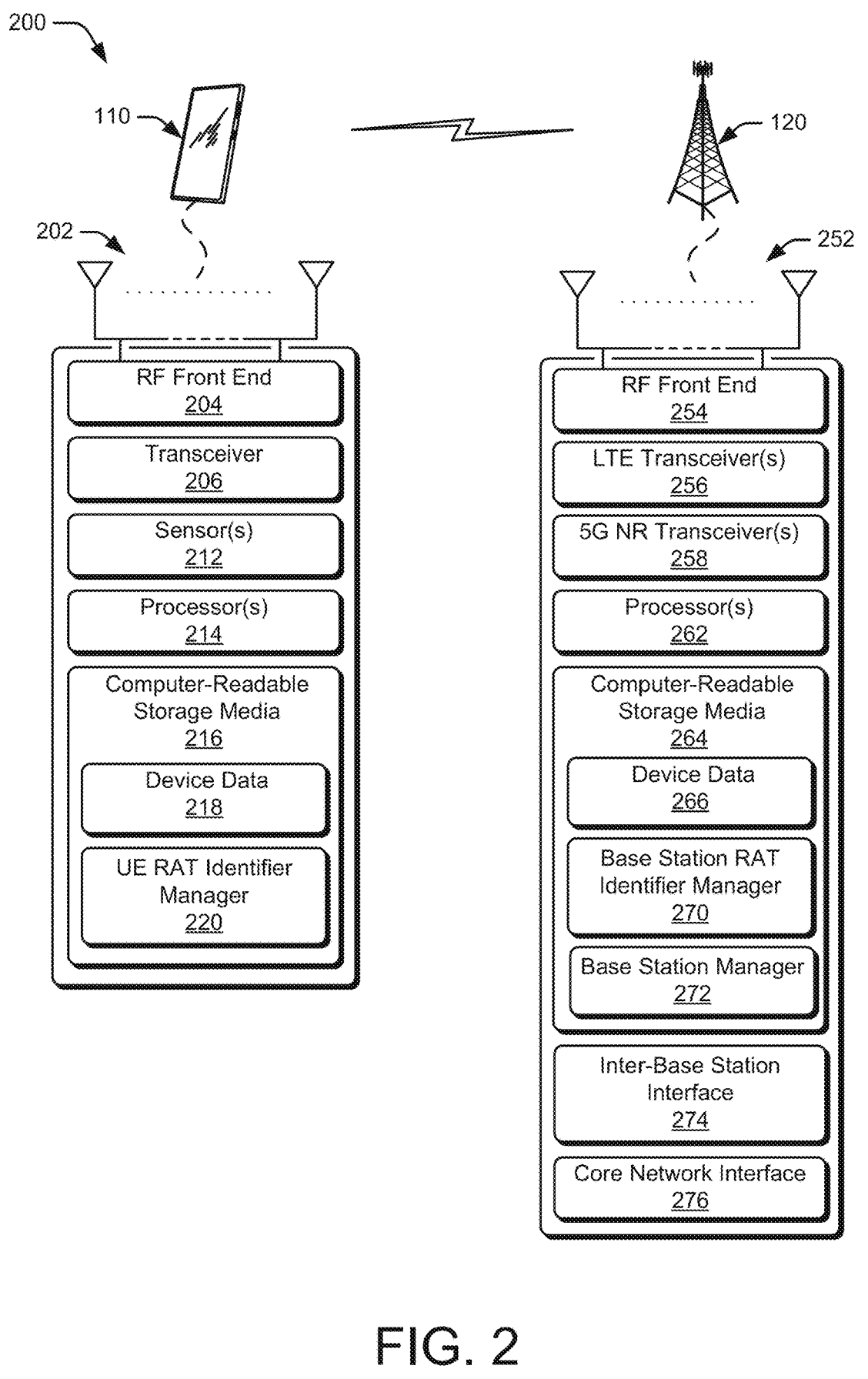

FIG. 2 illustrates an example device diagram 200 of the UE 110 and base stations 120. Generally, the device diagram 200 illustrates network entities that can implement various aspects of radio access technology identifiers. FIG. 2 shows respective instances of the UE 110 and the base stations 120. The UE 110 or the base stations 120 may include additional functions and interfaces that are omitted from FIG. 2 for the sake of visual brevity. The UE 110 includes antennas 202, a radio frequency front end 204 (RF front end 204), and a radio-frequency transceiver 206, such as an LTE transceiver, a 5G NR transceiver, a Wi-Fi 6E transceiver, and/or a 6G transceiver for communicating with base station 120 in the RAN 140 and/or the WLAN AP 160. In aspects, the UE 110 uses a single transceiver to maintain the wireless link 130 and the wireless link 106 by using one or more sharable air interface resources as further described. The RF front end 204 of the UE 110 can couple or connect the transceiver(s) 206 to the antennas 202 to facilitate various types of wireless communication.

The antennas 202 of the UE 110 may include an array of multiple antennas that are configured similar to or differently from each other. The antennas 202 and the RF front end 204 can be tuned to, and/or be tunable to, one or more frequency bands defined by the 3GPP LTE, 5G NR communication standards, and/or Wi-Fi 6E communication standards implemented by the transceiver(s) 206. Additionally, the antennas 202, the RF front end 204, the transceiver(s) 206 may be configured to support beamforming for the transmission and reception of communications with the base station 120 and the WLAN AP 160. By way of example and not of limitation, the antennas 202 and the RF front end 204 can be implemented for operation in sub-gigahertz bands, sub-6 GHz bands, Wi-Fi 6E operating frequencies (e.g., 6 GHz band) and/or above 6 GHz bands that are defined by the 3GPP LTE, 5G NR communication standards (e.g., 57-64 GHz, 28 GHz, 38 GHz, 71 GHz, 81 GHz, or 92 GHz bands).

The UE 110 includes sensors 212 that can be implemented to detect various properties such as temperature, orientation, acceleration, proximity, distance, supplied power, power usage, battery state, or the like. As such, the sensors of the UE 110 may include any one or a combination of accelerometers, gyros, depth sensors, distance sensors, temperature sensors, thermistors, battery sensors, and power usage sensors.

The UE 110 also includes processor(s) 214 and computer-readable storage media 216 (CRM 216). The processor 214 may be a single core processor or a multiple core processor implemented with a homogenous or heterogeneous core structure. The computer-readable storage media described herein excludes propagating signals. CRM 216 may include any suitable memory or storage device such as random-access memory (RAM), static RAM (SRAM), dynamic RAM (DRAM), non-volatile RAM (NVRAM), read-only memory (ROM), or Flash memory useable to store device data 218 of the UE 110. The device data 218 includes any combination of user data, multimedia data, codebook(s), applications, and/or an operating system of the UE 110. In implementations, the device data 218 stores processor-executable instructions that are executable by processor(s) 214 to enable user-plane communication, control-plane signaling, and user interaction with the UE 110.

The CRM 216 of the UE 110 includes a user equipment-radio access technology-identifier manager (UE RAT identifier manager 220). Alternatively, or additionally, the UE RAT identifier manager 220 may be implemented in whole or part as hardware logic or circuitry integrated with or separate from other components of the UE 110. In response to the UE 110 receiving a RAT-identifier-presence indicator, the UE RAT identifier manager 220 analyzes the RAT-identifier-presence indicator to determine a presence of RAT identifiers, such as by determining where to locate the RAT identifiers using downlink air interface resources (e.g., beam direction, bandwidth portion, a carrier frequency, a time duration) indicated by the RAT-identifier-presence indicator. At times, the UE RAT identifier manager 220 determines or requests transceiver configurations for the UE 110 to receive the RAT identifiers based on the RAT-identifier-presence indicator. The UE RAT identifier manager 220 alternatively or additionally analyzes received RAT identifiers and processes sharable air interface resources (e.g., a frequency band, a carrier frequency, a time duration) based on information indicated by the RAT identifiers.

The device diagram for the base stations 120, shown in FIG. 2, includes a single network node (e.g., a gNode B). The functionality of the base stations 120 may be distributed across multiple network nodes or devices and may be distributed in any fashion suitable to perform the functions described herein. The base stations 120 include antennas 252, a radio frequency front end 254 (RF front end 254), one or more LTE transceivers 256 and/or one or more 5G NR transceivers 258 for communicating with the UE 110. The RF front end 254 of the base stations 120 can couple or connect the LTE transceivers 256 and the 5G NR transceivers 258 to the antennas 252 to facilitate various types of wireless communication. The antennas 252 of the base stations 120 may include an array of multiple antennas that are configured similar to or differently from each other. The antennas 252 and the RF front end 254 can be tuned to, and/or be tunable to, one or more frequency bands defined by the 3GPP LTE and 5G NR communication standards, and implemented by the LTE transceivers 256 and/or the 5G NR transceivers 258. Additionally, the antennas 252, the RF front end 254, the LTE transceivers 256 and/or the 5G NR transceivers 258 may be configured to support beamforming, such as Massive-MIMO, for the transmission and reception of communications with the UE 110.

The base stations 120 also include processor(s) 262 and computer-readable storage media 264 (CRM 264). The processor 262 may be a single core processor or a multiple core processor composed of a variety of materials, such as silicon, polysilicon, high-K dielectric, copper, and so on. CRM 264 may include any suitable memory or storage device such as random-access memory (RAM), static RAM (SRAM), dynamic RAM (DRAM), non-volatile RAM (NVRAM), read-only memory (ROM), or Flash memory useable to store device data 266 of the base stations 120. The device data 266 includes network scheduling data, radio resource management data, applications, codebook(s), and/or an operating system of the base stations 120, which are executable by processor(s) 262 to enable communication with the UE 110.

In aspects, the CRM 264 of the base station 120 includes a base station-radio access technology-identifier manager 270 (BS RAT identifier manager 270). Alternatively, or additionally, the BS RAT identifier manager 270 may be implemented in whole or part as hardware logic or circuitry integrated with or separate from other components of the base station 120. The BS RAT identifier manager 270 apportions or allocates a sharable air interface resource between multiple RATs, such as by allocating and/or apportioning a carrier frequency between a first RAT implemented by the base station 120 and a second RAT implemented by WLAN AP 160 and/or other base stations during specific time periods. The BS RAT identifier manager 270 then communicates the schedule by directing the base station 120 to broadcast a RAT-identifier-presence indicator to multiple UEs and/or to send the RAT-identifier-presence indicator using UE-specific messaging. In some aspects, the BS RAT identifier manager 270 communicates air interface resource prospective usage information (e.g., an expected transmission periodicity, and/or transmission priority information) to other base stations.

CRM 264 includes a base station manager 272. Alternatively, or additionally, the base station manager 272 may be implemented in whole or part as hardware logic or circuitry integrated with or separate from other components of the base stations 120. In at least some aspects, the base station manager 272 configures the LTE transceivers 256, 5G NR transceivers 258, and 6G transceiver(s) (not shown) for communication with the UE 110 and/or communication with a core network. The base stations 120 include an inter-base station interface 274, such as an Xn and/or X2 interface (wired or wireless), which the base station manager 272 configures to exchange user-plane and control-plane data between another base station 120, to manage the communication of the base stations 120 with the UE 110. The base stations 120 include a core network interface 276 that the base station manager 272 configures to exchange user-plane data and control-plane information with core network functions and/or entities.

Figure 3:
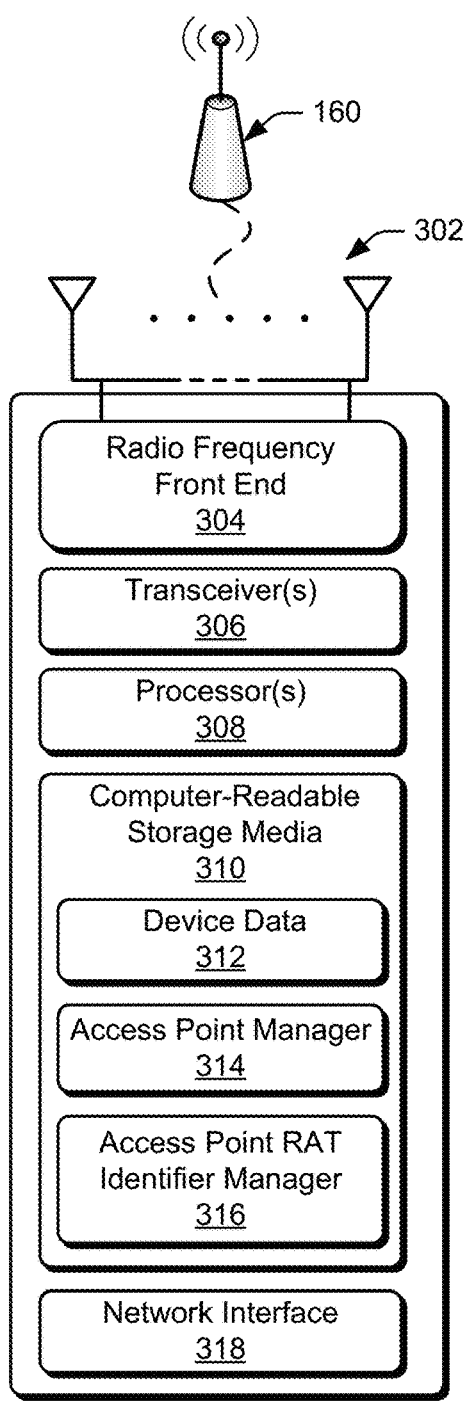
FIG. 3 illustrates an example device diagram of a network that can implement various aspects of radio access technology identifiers.

FIG. 3 illustrates an example device diagram 300 of the WLAN AP 160 base station implementation. The WLAN AP 160 may include additional functions and interfaces that are omitted from FIG. 3 for the sake of clarity.

The WLAN AP 160 includes antennas 302, a radio frequency front end 304 (RF front end 304), one or more transceivers 306 that are configured for WLAN communication with the UE 110. The RF front end 304 can couple or connect the transceivers 306 to the antennas 302 to facilitate various types of wireless communication, such as Wi-Fi 6E communications. The antennas 302 of the WLAN AP 160 may include an array of multiple antennas that are configured similarly to or differently from each other. The antennas 302 and the RF front end 304 can be tuned to, and/or be tunable to, one or more frequency bands defined by the IEEE 802.11 (e.g., including IEEE 802.11ax) communication standards and implemented by the transceivers 306. Additionally, the antennas 302, the RF front end 304, and/or the transceivers 306 may be configured to support beamforming for the transmission and reception of communications with the UE 110.

The WLAN AP 160 also includes processor(s) 308 and computer-readable storage media 310 (CRM 310). The processor 308 may be a single core processor or a multiple core processor composed of a variety of materials, such as silicon, polysilicon, high-K dielectric, copper, and so on. CRM 310 may include any suitable memory or storage device such as random-access memory (RAM), static RAM (SRAM), dynamic RAM (DRAM), non-volatile RAM (NVRAM), read-only memory (ROM), or Flash memory useful to store device data 312 of the WLAN AP 160. The device data 312 includes network scheduling data, radio resource management data, applications, and/or an operating system of the WLAN AP 160, which are executable by processor(s) 308 to enable communication with the UE 110.

CRM 310 also includes an access point manager 314, which, in one implementation, is embodied on CRM 310 (as shown). Alternately or additionally, the access point manager 314 may be implemented in whole or part as hardware logic or circuitry integrated with or separate from other components of the WLAN AP 160. In at least some aspects, the access point manager 314 configures the transceivers 306 for communication with the UE 110, as well as communication of user-plane and control-plane data with the core network 150 via a network interface 318.

CRM 310 includes an access point RAT identifier manager 316 (AP RAT identifier manager 316). Alternatively, or additionally, the AP RAT identifier manager 316 may be implemented in whole or part as hardware logic or circuitry integrated with or separate from other components of the base station 120. Similar to the BS RAT identifier manager 270 of FIG. 2, the AP RAT identifier manager 316 apportions or allocates a sharable air interface resource between multiple RATs, such as by allocating and/or apportioning a carrier frequency between a first RAT implemented by the base station 120 and a second RAT implemented by the WLAN AP 160. This can include communicating and/or coordinating with another RAT identifier manager (e.g., the BS RAT identifier manager 270) to determine the proportioning of the sharable air interface resource. In aspects, the AP RAT identifier manager 316 receives an indication of the proportioning from the base station 120, while in other aspects, the AP RAT identifier manager 316 communicates the proportioning to the base station 120, such as through the Internet 180 and/or core network 150. In some aspects, the AP RAT identifier manager 316 communicates air interface resource prospective usage information (e.g., an expected transmission periodicity, and/or transmission priority information) to other base stations.

Radio Access Technology Identifiers

Figure 4:
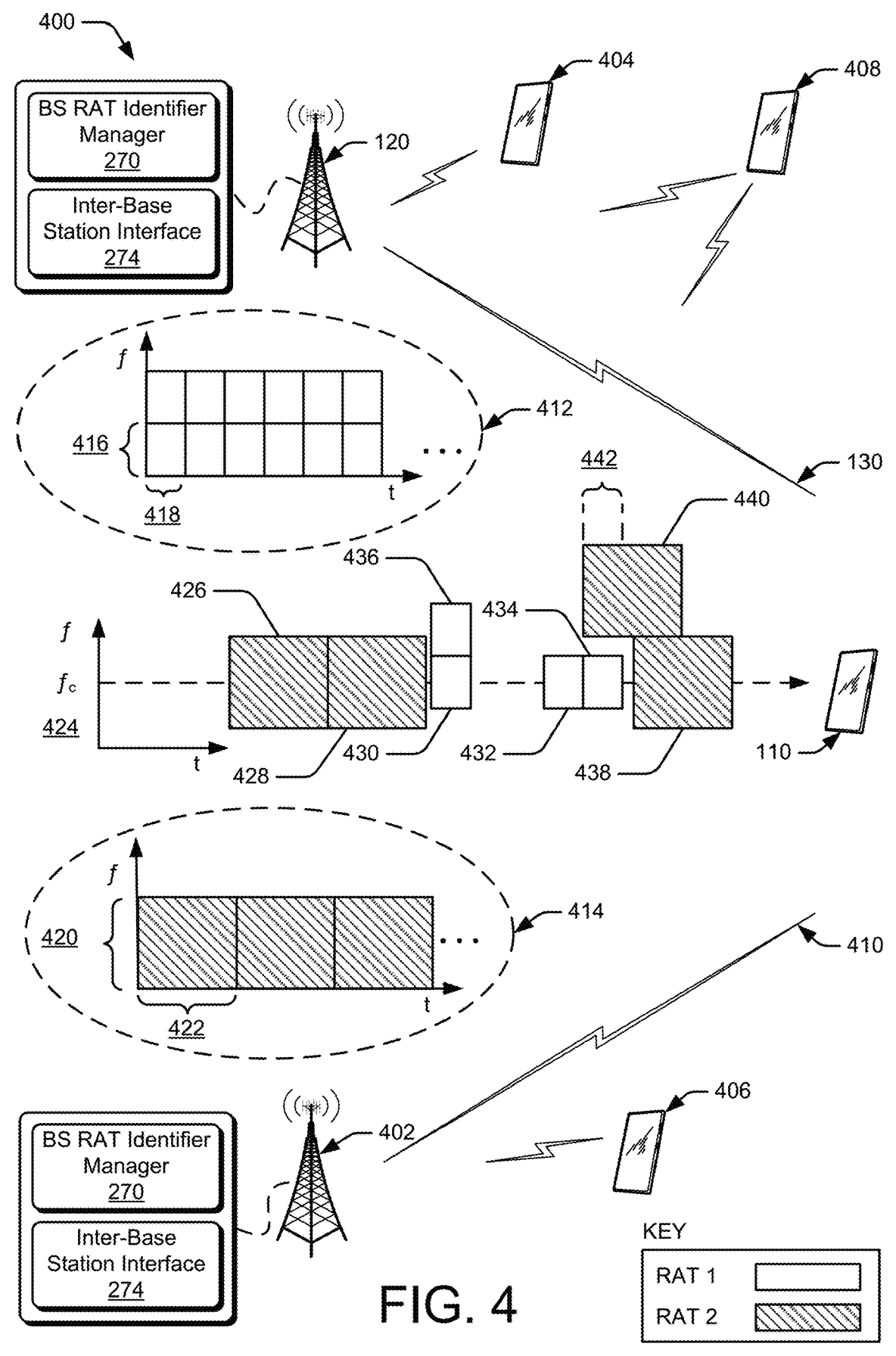

FIG. 4 illustrates an example environment 400 in which radio access technology identifiers are implemented in accordance with various aspects. The environment 400 includes the base station 120 of FIG. 1, where the base station 120 supports a first RAT, and a second base station 402 that supports a second RAT. In other words, the wireless device implementing the second RAT is a base station 402 rather than a WLAN AP 160 (as shown in FIG. 1). In the environment 400, the base stations maintain various wireless links to different UEs. As a first example, the base station 120 maintains a single-connectivity wireless link with the UE 404. As a second example, the base station 402 maintains a single-connectivity wireless link with the UE 406. As yet a third example, the base station 120 and a third base station (not shown) both maintain wireless links to the UE 408, such as through dual connectivity using separate radios and/or carrier aggregation using two carrier frequencies.

The environment 400 also includes the UE 110 of FIG. 1, where the base station 120 communicates with the UE 110 over the wireless link 130 using a first RAT and the base station 402 with the UE 110 over the wireless link 410 using a second RAT, where the first wireless link 130 and the wireless link 410 correspond to contemporaneous wireless links that use apportioned (sharable) air interface resources between one another. In other words, even though the wireless link 130 and the wireless link 410 utilize different RATs with different space-time-frequency partitioning schemes and/or different modulation and coding schemes (MCS), the links occupy air interface resources that overlap with one another, such as a common carrier frequency, a common time duration, a common frequency range, and so forth, on an apportioned basis. The partitioning of sharable air interface resources can include any combination of RATs, such as 5G-U implemented by a cellular base station and Wi-Fi 6E implemented by a WLAN AP base station (e.g., WLAN AP 160).

To illustrate, the base station 120 implements a first RAT that uses a first air interface resource partitioning scheme 412 while the base station 402 implements a second RAT that uses a second air interface resource partitioning scheme 414. The base station 120, for example communicates using a first frequency range 416 over a first time duration 418 defined by the first air interface resource partitioning scheme 412 of the first RAT. Similarly, the base station 402 communicates using a second frequency range 420 over a second time duration 422 defined by the second air interface resource partitioning scheme 414 of the second RAT. While the schemes 412 and 414 illustrate time and frequency partitioning, the base stations may use alternate or additional schemes include space partitioning, such as through beams, coding scheme partitioning, modulation scheme partitioning, and so forth. In aspects, the first frequency range 416 has a different size than the second frequency range 420, but at least portions of the two frequency ranges overlap. Alternatively, or additionally, the time duration 418 has a different length than the time duration 422, but at least portions of the time durations overlap.

For clarity, the first air interface resource partitioning scheme 412 and the second air interface resource partitioning scheme 414 illustrate portions of corresponding partitioning schemes defined by the RATs and can include additional resource allocations not illustrated in the environment 400. For instance, the schemes 412 and 414 can correspond to a grid or matrix of multiple frequency ranges over elapsed time. The schemes 412 and/or 414 may span any suitable frequency range, and/or may be divided into intervals of any specified duration. A first frequency range defined by the scheme 412 may be different from a second frequency range defined by the scheme 414. Increments of time can correspond to, for example, milliseconds (mSec.), and can correspond to RAT-specific frames, subframes, slots, or symbol lengths. Increments of frequency can correspond to, for example, kilohertz (kHz) or megahertz (MHz). Alternatively, or additionally, one or both schemes 412 and 414 can include multiple subcarriers or frequency sub-bands. In aspects, the frequency ranges and/or time durations between the schemes 412 and 414, though different, overlap. For example, the frequency band 416 of the scheme 412 may span a smaller range of frequencies than the frequency band 420 but have portions that overlap. To illustrate, a first transmission with the frequency band 416 may overlap with a second transmission with the frequency band 420 when the first and second transmissions use a same carrier frequency, such as a sharable carrier frequency 424. Alternatively, the carrier frequencies may differ, or the channel bandwidths of the different RATs overlap in yet another different manner as shown by transmissions 430 and 436.

The base station 120 and the base station 402 each include a respective instance of the stations RAT identifier manager 270 of FIG. 2. In aspects, the base station 120 and the base station 402 apportion (by way of the respective B S RAT identifier managers) sharable air interface resources between the wireless links 130 and 410. For example, one or both of the respective BS RAT identifier managers determine the allocation of the shared air interface resources between the wireless links 130 and 410. The carrier frequency 424 corresponds to an example sharable air interface resource apportioned between the first wireless link 130 (implemented by the base station 120 using a first RAT and/or scheme 412) and the second wireless link 410 (implemented by the base station 402 using a second RAT and/or scheme 414). Transmissions for the first RAT over the first wireless link and transmissions for the second RAT over the second wireless link each occupy the carrier frequency 424 (or otherwise overlap frequency channels) to communicate with the UE 110. However, to avoid collisions and/or contention, the base stations 120 and 402 intersperse the respective RAT communications (e.g., downlink or uplink) with varying recurrence. Transmission 426 and transmission 428, for example, corresponds to a first and second transmission made by the base station 402 using the second RAT, where the transmissions 426 and 428 use the apportioned carrier frequency (e.g., carrier frequency 424) for particular time durations (e.g., time duration 422). The base stations 120 and 402 then switch which base station (and corresponding wireless link) uses the apportioned carrier frequency, and the base station 120, using the first RAT (e.g., RAT 1), communicates with the UE 110 using transmission 430, 432, transmission 434, and transmission 436 for (different) particular time durations (e.g., time duration 418), where the transmissions 430, 432, and 434 use the apportioned carrier frequency. The base station 120 also communicates with the UE 110 using transmission 436, where the transmission 436 occupies a different carrier frequency than the apportioned carrier frequency (e.g., carrier frequency 424) but shares a same time duration as the transmission 430. The base stations again switch which base station (and corresponding wireless link) uses the apportioned carrier frequency, and the base station 402 communicates with the UE 110 using the apportioned carrier frequency for the transmission 438, and using the transmission 440 with a different carrier frequency.

While the sharable air interface resource corresponds to an overlapping frequency channel (e.g., carrier frequency 424), in alternate or additional implementations the sharable air interface resource corresponds to a time duration. To illustrate, consider the transmission 434 from the base station 402 and the transmission 440 from the base station 120. In implementations, instead of apportioning a carrier frequency between the transmissions, the base station 120 (and/or the base station 402) apportions a particular time duration between the transmissions by assigning different carrier frequencies for the transmissions so that the two frequency channels do not overlap. For instance, the transmission 434 and the transmission 440 concurrently occupy a time duration 442 by using different carrier frequencies. In other words, the transmission 434 and the transmission 440 overlap and/or share the time duration 442, where the transmission 434 uses the apportioned carrier frequency, $f_c$, and the transmission 440 uses a different carrier frequency.

In various implementations, the base station 120 and the base station 402 communicate with one another, such as by using the inter-base station interface 274 and/or the network interface 318 (not illustrated), to coordinate the apportioning of the carrier frequency 424 and/or other air interface resources. As one example, the BS RAT identifier manager 270 of the base station 120 communicates with the BS RAT identifier manager 270 at the base station 402 to request a larger allocation (e.g., 60%, 80%, 90%) of the (apportioned) sharable air interface resource(s), such as in response to the first RAT/base station 120 being assigned a large quantity of user-plane data to transmit to the UE 110. As another example, the BS RAT identifier manager 270 of the base station 402 communicates with the BS RAT identifier manager 270 of the base station 120 to request immediate access (e.g., anomalous or high-priority access that differs from a set schedule) to the sharable air interface resource based on a need to transmit high-priority commands and/or data to the UE 110. In aspects, the one or both of the BS RAT identifier managers determine the allocation of the sharable air interface resource(s) using priority information. To illustrate a first RAT transmission may be given higher priority over a second RAT transmission based on the RATs being prioritized over one another, the second RAT transmission may have higher priority Quality-of-Service (QoS) requirements (e.g., low latency) relative to the first RAT transmission, and so forth. Alternatively or additionally, the priority information indicates a priority for a finite duration, such as a session-based priority (e.g., over the duration of a session), a frame-based priority (e.g., over the duration of a frame), or a slot-based priority (e.g., over the duration of a slot). In some instances, the priority indicates a RAT priority (e.g., prioritizing all transmissions of a first RAT over all transmissions of a second RAT).

In the environment 400, the respective BS RAT identifier managers of the base station 120 and the base station 402 collaborate to determine the allocation of the sharable air interface resources. This can include one of the BS RAT identifier managers acting as a master BS RAT identifier manager that indicates, to a secondary BS RAT identifier manager at the other base station, the allocation of the sharable air interface resources. As another example, the secondary BS RAT identifier manager requests, from the master BS RAT identifier manager, a specific allocation and/or specific proportioning of the sharable air interface resources. In other words, the secondary BS RAT identifier manager determines and requests the specific allocation from the master BS RAT identifier manager.

In other aspects, a single BS RAT identifier manager determines the allocation and communicates the allocation to other base station (and/or AP) RAT identifier managers. As one example, the RAT identifier manager 270 implemented by the base station 120 determines and apportions the sharable air interface resources and communicates the allocation to a second BS (and/or AP) RAT identifier manager. As another example, a single base station implements a first wireless link (e.g., the wireless link 130) using a first RAT and a second wireless link (e.g., the wireless link 106) using a second RAT. A BS RAT identifier manager of the single base station (solely) manages the allocation of the sharable air interface resources used by the contemporaneous wireless links with the UE 110.

In aspects, a first wireless link and a second wireless link, whether implemented by different base stations or a same base station share air interface resources by synchronizing with one another in time and frequency. As one example, at a physical layer, each base station receives global navigation satellite system (GNSS) signals and derives a common time chronology from the GNSS signals. Alternatively, or additionally, the base stations(s) utilize Synchronous Ethernet and/or E1/T1 signals to synchronize frequency and time. This supports base stations implementing the RAT(s) to align time and frequency with one another, even if the RATs utilize different timing structures (e.g., different slot durations, different frame durations). Since the base stations synchronize time and frequency, the base stations share a common timing reference, thus enabling the base station(s) to apportion air resources between different RAT transmissions. To coordinate the UE 110 with the varying RAT communications over the sharable air interface resources, implementations first communicate a RAT-identifier-presence schedule that indicates downlink air interface resources of a RAT identifier, and then transmit the RAT identifier at the indicated downlink air interface resources to convey an assigned RAT for the common (sharable) air interface resource(s).

FIG. 5 illustrates an example environment 500 in which radio access technology identifiers are implemented in accordance with various aspects. The environment 500 includes the base station 120 and various instances of the UE 110 of FIG. 1, labeled as UE 502, UE 504, UE 506, and UE 508, respectively.

At 510, the base station 120 transmits RAT-identifier-presence indicator 512 to indicate a presence of RAT identifiers at various downlink air interface resources (e.g., beam direction, bandwidth portion, a carrier frequency, a time duration). As one example, the base station 120 transmits a broadcast message that includes the RAT-identifier-presence indicator 512, where the RAT-identifier-presence indicator 512 indicates the presence of a RAT identifier at a specific air interface resource by directly indicating the various downlink air interface resource(s) of the RAT identifier transmission or indirectly indicating (e.g., through use of an indexed table). As another example, the base station 120 transmits the RAT-identifier-presence indicator 512 in a Radio Resource Control (RRC) message to a specific UE (e.g., UE 502). The base station 120 can transmit the RAT-identifier-presence indicator 512 over any suitable timeframe. In one or more implementations, the base station 120 periodically transmits the RAT-identifier-presence indicator 512, such as by using a timing period similar to those used for system information blocks (SIBs). Alternatively, or additionally, the base station 120 asynchronously transmits the RAT-identifier-presence indicator 512, such as in response to determining new allocations and/or proportioning for the sharable air interface resources. In aspects, the RAT-identifier-presence indicator 512 conveys the presence of a RAT identifier through downlink air interface resources.

As one example, the RAT-identifier-presence indicator 512 includes an indication of a RAT identifier beam direction 514 to specify a particular beam and/or beam direction used to transmit the RAT identifier. This can include indicating an absolute beam and/or beam direction (e.g., a specific beam with a specific direction) or a relative beam direction (e.g., a beam direction shifted by 5 degrees relative to a received beam). As another example, the RAT-identifier-presence indicator optionally includes an indication of a RAT identifier bandwidth portion 516 that specifies a portion of a frequency band used to transmit the RAT identifier. In some aspects, the RAT-identifier-presence indicator includes an indication of a carrier frequency used to transmit the RAT identifier, labeled in the environment 500 as RAT identifier carrier frequency 518. The RAT identifier carrier frequency 518 enables the base station 120 to indicate cross-carrier locations of the RAT identifier. To illustrate, the base station 120 transmits the RAT-identifier-presence indicator 512 using a first carrier frequency and indicates a second carrier frequency for the RAT identifier using the RAT identifier carrier frequency 518. In implementations, the RAT identifier carrier frequency 518 indicates an index value that maps to a particular carrier frequency. In aspects, the RAT identifier indicates an absolute carrier frequency (e.g., 6.1 GHz) or a relative carrier frequency (e.g., 100 MHz away from a received carrier frequency).

The RAT-identifier-presence indicator 512 includes an indication of a RAT identifier start time 520 and/or RAT identifier time duration 522 to communicate timing information that can be used to locate a RAT identifier transmission. For instance, the RAT identifier start time 520 indicates an absolute time (e.g., based on GNSS timing, based on Ethernet timing), or a relative time (e.g., based on transmission/reception times), that conveys a point in time the transmission, and subsequently the RAT identifier, begins. To illustrate, the RAT identifier start time 520 can indicate a relative time based on a transmission time of the RAT-identifier-presence indicator 512. The RAT identifier time duration 522 indicates a time duration (e.g., 10 microseconds, 12.5 microseconds, 25 microseconds) for the RAT identifier. In some aspects, a RAT identifier has a variable configuration and/or length based on a variable RAT identifier configuration that modifies what information is included in and/or excluded from the RAT identifier. The RAT identifier time duration 522 can implicitly indicate the RAT identifier configuration. A first time duration, for example, indicates a first configuration of the RAT identifier, while a second, longer time duration indicates a second configuration of the RAT identifier that includes more information than the first configuration.

In implementations, the base station 120 updates the RAT-identifier-presence indicator. For instance, assume that the base station 120 reallocates a sharable air interface resource based on receiving a communication from another base station that requests the (apportioned) sharable air interface resource at an increased regularity, a greater time duration (e.g., slot length), and/or a larger channel bandwidth from a current allocation. The base station 120 reallocates the sharable air interface resources based on the communication and updates the RAT identifier to indicate the reallocation. In reallocating the sharable air interface resources, the base station 120 sometimes allocates different air interface resources between the wireless links. For example, assume the base station 120 apportions a first air interface resource between two wireless links. In determining the reallocation, the base station 120 identifies a second air interface resource that is different from the first air interface resource and uses the second air interface resource for the reallocation. The base station 120 then updates the RAT identifier to indicate the second allocation uses the second air interface resource.

In some instances, the base station 120 generates an updated RAT-identifier-presence indicator. For instance, assume the RAT-identifier-presence indicator indicates a first downlink air interface resource that is used for a RAT identifier transmission. In some aspects, the base station 120 identifies a second downlink air interface resource that is different from the first downlink air interface resource and updates the RAT-identifier-presence indicator to replace the first downlink air interface resource with the second downlink air interface resource. The base station 120 then transmits the updated RAT-identifier-presence indicator to indicate the second downlink air interface resource, and also transmits the RAT identifier using the second downlink air interface resource indicated by the updated RAT-identifier-presence indicator.

Figure 6:
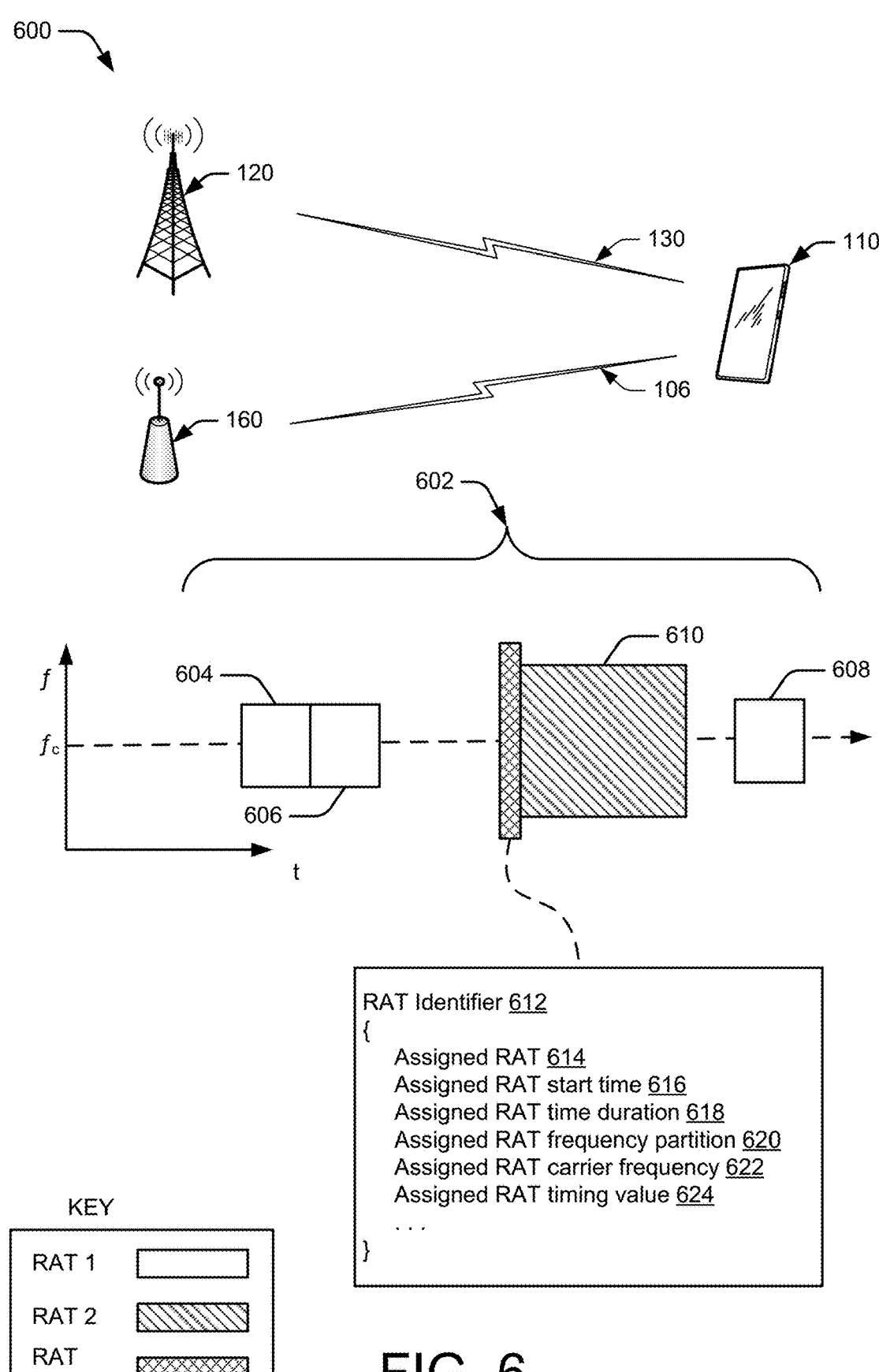
FIG. 6 illustrates an example environment in accordance with various implementations of radio access technology identifiers.

FIG. 6 illustrates an example environment 600 in which radio access technology identifiers are implemented in accordance with various aspects. The environment 600 includes the base station 120, the WLAN AP 160 implementation of a base station, and the UE 110 of FIG. 1, where the base station 120 and the WLAN AP 160 communicate with the UE 110 over the wireless links 130 and 106 using sharable air interface resource(s) 602 for communications with the UE 110. While the environment 600 illustrates the sharable air interface resource 602 as a carrier frequency, the sharable air interface resource 602 can include alternate or additional air interface resources in space-time-frequency (e.g., any combination of a frequency band, a carrier frequency, a time duration, a frequency partition).

Multiple RAT transmissions occupy the sharable air interface resources 602 on an apportioned basis, such as by using the schemes 412 and 416 of FIG. 4. For example, downlink transmission 604, downlink transmission 606, and downlink transmission 608 correspond to downlink transmissions generated by the base station 120 using RAT 1, while the downlink transmission 610 corresponds to a downlink transmission generated by the WLAN AP 160 using RAT 2. Each of the downlink transmissions 604, 606, 608, and 610 occupy the sharable air interface resource 602 at different points in time. In aspects, the timing durations for the downlink transmissions correspond to any suitable time duration, such as a RAT frame, a RAT subframe, a number of RAT symbols, and so forth.

A base station (e.g., base station 120, WLAN AP 160) utilizing the sharable air interface resource(s) transmits a RAT identifier, such as RAT identifier 612, to indicate an assigned RAT to the sharable air interface resource 602. This indicates, to the UE 110 receiving the downlink transmissions, which RAT (and corresponding scheme) to use when processing the sharable air interface resource. For example, the base station 120 transmits the RAT identifier 612 prior to a beginning of the downlink transmission 610 to indicate, to the UE 110, the allocation and or assignment of assigned RAT 614 to the sharable air interface resource 602. The UE 110 uses the indication to determine how to process signals received using the sharable air interface resource 602 (e.g., as a RAT 1 communication or a RAT 2 communication). For example, the base station 120 transmits a RAT identifier that indicates an assigned RAT implemented by the WLAN AP 160. For clarity, the RAT identifier 612 occupies the same carrier frequency as the transmissions 604, 606, 608, and 610 in this example, but other frequencies and/or air interface resources can be used instead of sharable air interface resources to transmit the RAT identifier 612. Further, while the sharable air interface resource 602 illustrates a carrier frequency being apportioned between the wireless links, the apportioned sharable air interface resources can include multiple and/or alternate air interface resources (e.g., a time duration, a frequency partition, a carrier frequency). In aspects, the RAT identifier 612 implicitly indicates a time assignment (e.g., a start time) for the proportioning of the sharable air interface resource 602 based on being located at the beginning of the assigned time duration.

The base station 120 includes, in the RAT identifier 612, additional indications of characteristics about the (allocated and/or assigned) sharable air interface resources, such as an indication of an assigned RAT start time 616 that specifies a start time for the allocation to the assigned RAT and/or an indication of an assigned RAT time duration 618. In some aspects, the indication of the assigned RAT start time 616 explicitly identifies an exact start time, while in other aspects the indication of the assigned RAT start time 616 identifies the start time using relative information (e.g., a time duration not directly after the RAT identifier transmission). The indication of the assigned RAT time duration 618 specifies a portion or length of the allocation. For example, the RAT identifier indicates that the assignment of the sharable air interface resource 602 for the transmission 610 spans only a portion of a time duration defined by the RAT 2 air interface resource scheme.

At times, the base station 120 explicitly indicates the allocation of the sharable air interface resources to a first RAT transmission and/or implicitly indicates the allocation of the sharable air interface resources to a second RAT transmission. To illustrate, the RAT identifier 612 explicitly identifies a first RAT (e.g., assigned RAT 614) assigned to the sharable air interface resources and a duration of the assignment (e.g., assigned RAT start time 616, assigned RAT time duration 618). In aspects, the RAT identifier implicitly indicates timing information based on the assigned RAT (e.g., based on the assigned RAT air interface resource scheme). A UE 110 processing the RAT identifier 612 identifies not only the explicit resource allocations indicated by the RAT identifier 612 (e.g., the first RAT and a duration for the assignment), but also identifies implicit resource allocations indicated by the RAT identifier 612. For instance, the UE 110 determines, implicitly, to process the sharable air interface resources using a second RAT after the indicated duration expires.

In aspects, the RAT identifier 612 includes an indication of an assigned RAT frequency partition 620 that specifies a frequency partition. To illustrate, in some implementations, the first RAT transmission and the second RAT transmission share a common (or same) time duration with a common (or same) start time but with different frequency partitioning. The RAT identifier 612 indicates, through the use of the assigned RAT frequency partition 620, a frequency-domain space and/or partition (e.g., a frequency bandwidth portion) for communications using the assigned RAT. To illustrate, consider the start of the transmission 608. Assume that the transmission 608 occupies a first frequency partition of a sharable frequency band. A second RAT transmission can transmit at the same start time and/or during the same time duration as the transmission 608 transmission time by occupying a second frequency partition of the sharable frequency band specified by the assigned RAT frequency partition 620.

At times, the RAT identifier 612 includes an indication of an assigned RAT carrier frequency 622, which allows a base station (e.g., base station 120) to indicate cross-carrier information (e.g., transmitting, using a first carrier frequency, an indication of a (second) apportioned carrier frequency). For instance, in the environment 600, the base station 120 transmits the RAT identifier 612 using a first carrier frequency denoted as $f_c$. In some aspects, the base station indicates a second, and different, carrier frequency in the RAT identifier 612 to indicate that the second, different carrier frequency (e.g., not $f_c$) has been apportioned to the assigned RAT. For example, the base station 120 indicates, as the assigned RAT carrier frequency 622, an index value that corresponds to the apportioned carrier frequency, where the index value maps to a carrier frequency in a table and/or codebook. Thus, the assigned RAT carrier frequency 622 allows the base station 120 to explicitly indicate an apportioned carrier frequency, where the apportioned carrier frequency can be different than the carrier frequency used to transmit the indication. Alternatively, or additionally, the RAT identifier 612 indicates a specific start time and/or time duration (or partition) using the assigned RAT start time 616, the assigned RAT time duration 618, and/or a specific frequency partition using the assigned RAT frequency partition 620. Accordingly, the RAT identifier 612 can explicitly indicate specific carrier frequencies and/or specific time durations, rather than implicitly indicating carrier frequencies and/or time durations, such as implicit indications based on space-time-frequency characteristics of signals used to transmit the RAT identifier.

The RAT identifier 612 sometimes includes an assigned RAT timing value 624. For instance, the assigned RAT timing value 624 corresponds to a timing offset relative to the RAT identifier 612 or a timing periodicity value that indicates a periodic assignment of the sharable air interface resource to the assigned RAT. This can include indicating a slot offset and/or a slot periodicity of the RAT assignment to the sharable air interface resource. Thus, at times, the RAT identifier 612 includes the assigned RAT timing value 624 to indicate a timing relation between the RAT identifier and a forthcoming RAT assignment for the sharable air interface resource(s).

In aspects, the base station 120 (and/or the WLAN AP 160) transmits the RAT identifier 612 using a waveform identifiable to multiple RATs implemented at the UE 110. To illustrate, the base station 120 transmits the RAT identifier 612 using a fixed modulation (e.g., Quadrature Phase Shift Keying (QPSK)) and/or coding scheme such that the UE 110 detects the RAT identifier 612 whether processing a received signal based on a first RAT or a second RAT. In other words, the UE 110 identifies the RAT identifier 612, and the information indicated by the RAT identifier, whether processing the received signal as a 5G RAT signal or another RAT signal (e.g., 6G RAT, Wi-Fi 6E, etc.). To illustrate, the UE 110 identifies the downlink air interface resources used to transmit the RAT identifier 612 based on detecting and/or decoding a RAT-identifier-presence indicator (e.g., RAT-identifier-presence indicator 512). The UE 110 then receives and decodes the RAT identifier using blind decoding on the indicated downlink air interface resources.

In the environment 600, the base station 120 transmits the RAT identifier 612 at a beginning of a time duration to indicate an assigned RAT to at least portions of the time duration that follows the RAT identifier transmission. However, the base station 120 sometimes transmits the RAT identifier 612 using alternate or additional downlink air interface resources (e.g., carrier frequency, at the end of a time slot). In various aspects, the base station 120 transmits a RAT-identifier-presence indicator that implicitly indicates a presence of a RAT identifier by indicating, to the UE 110, RAT identifier downlink air interface resource(s). By using a RAT-identifier-presence indicator, the base station 120 can modify the allocation of sharable air interface resources (e.g., reallocate the of sharable air interface resources) and update the RAT identifiers to indicate the allocation. The RAT-identifier-presence indicator enables the base station 120 to update how often RAT identifiers are transmitted to indicate modified allocations (e.g., increase a frequency of RAT identifier transmissions, decrease the frequency of RAT identifier transmissions).

RAT-identifier-presence indicators indicate, to receiving UEs, the downlink air interface resources used to transmit RAT identifiers. UEs then locate and process the RAT identifiers to determine how to process a sharable air interface resource, such as a carrier frequency apportioned between multiple RATs. This enables the UE to process multiple wireless links using a single transceiver, thus reducing the cost and size of the UE while improving data capacity through simultaneous and/or contemporaneous wireless links implemented with multiple RATs that apportion common air interface resources. RAT identifiers also enable the reuse of air interface resources, such as by using the air interface resources during unused time periods of a first wireless link for communications by a second wireless link, which improves the efficiency and usage of the air interface resources by turning the unused time periods of the first wireless link into transmission opportunities for the second wireless link.

Signaling and Control Transactions for RAT Identifiers

Figure 7:
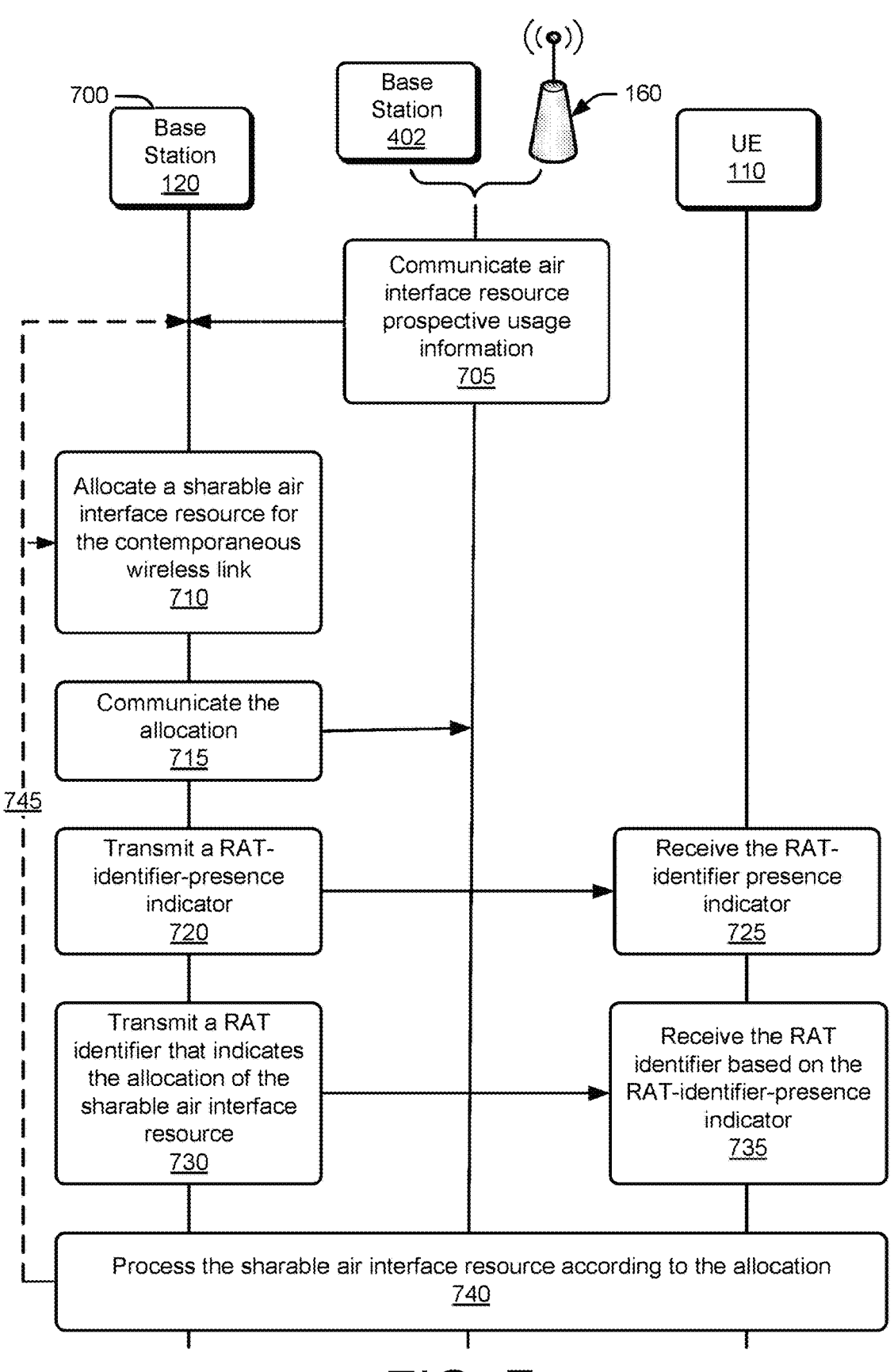
FIG. 7 illustrates a signaling and control transaction diagram between various network devices in accordance with one or more aspects of radio access technology identifiers.

FIG. 7 illustrates an example signaling and control transaction diagram 700 between various network entities, such as the base station 120 and the UE 110 of FIG. 1, the base station 402 of FIG. 4 in accordance with aspects of radio access technology identifiers. The base station 120, the base station 402, and the UE 110 may be implemented similar to the entities described with reference to FIGS. 1-6. Alternatively, or additionally, diagram 700 includes signaling and control transactions with the WLAN AP 160 of FIG. 1

At 705, the base station 402 optionally communicates air interface resource prospective usage information to the base station 120, where the for simultaneous and/or contemporaneous wireless links with a UE (e.g., UE 110). As a first example, assume the base station 120 currently maintains a first wireless link (e.g., wireless link 130) to the UE 110 using a first RAT and the base station 402 determines to establish, using a second RAT, a second, contemporaneous wireless link (e.g., wireless link 410, wireless link 106) to the UE 110. To illustrate, the base station 402 determines to establish the second, contemporaneous wireless link in response to the UE 110 requesting the second wireless link and/or the base station 120 directing the base station 402 to initiate the second wireless link to the UE 110. In aspects, the first wireless link implemented using a first RAT (by the base station 120) and the second wireless link implemented using the second RAT (by the base station 402) share air interface resources in either time, frequency, or space. The base station 402 communicates prospective usage information that the base station 120 analyzes to determine an allocation that apportions the sharable air interface resource between both wireless links. To illustrate, the base station 402 communicates an expected user-plane data volume, an expected transmission periodicity, and/or transmission priority information. As another example, assume the base station 120 and the base station 402 currently maintain wireless links to the UE 110, and the base station 402 identifies a high-priority communication to the UE 110. In implementations, the base station 402 communicates the prospective usage information (e.g., the high-priority communication) to the base station 120, such as through an Xn interface.

At 710, the base station 120 determines an allocation of a sharable air interface resource between at least two wireless links (e.g., a first wireless link implemented by the base station 120 using a first RAT, a second wireless link implemented by the base station 402 using a second RAT). In implementations, the base station determines the allocation using the information received from the base station 402 at 705. Alternatively, or additionally, the base station 120 determines the allocation based on prospective usage information relevant to the base station 120. As one example of determining the allocation, and with reference to FIG. 5, the base station 120 determines to allocate a sharable carrier frequency to the second wireless link (implemented using the second RAT) over a particular time duration. The base station 120 also allocates the sharable carrier frequency to the first wireless link (implemented using the first RAT), such as by allocating the sharable carrier frequency to the first wireless link during a first time duration (e.g., a first time slot defined by a first RAT air interface resource scheme) and allocating the sharable carrier frequency to the second wireless link during a second time duration (e.g., a second time slot defined by a second RAT air interface resource scheme). In some implementations, the base station 120 acts as a master and/or primary base station that coordinates the allocation of sharable air interface resources, while in alternate or additional implementations, the base station 402 determines and requests the allocation of sharable air interface resources from the base station 120. In yet other implementations, the base station 120 and the base station 402 negotiate with one another to determine the allocation (not illustrated). In aspects, the base station 120 explicitly and/or implicitly indicates the allocation of the sharable air interface resources, such as that described with reference to FIG. 6. As another example, the base station 120 determines an allocation that assigns the first and second wireless links (implemented using RAT 1 and RAT 2, respectively) to a common time duration, where each RAT transmission occupies a different portion of a common frequency band during the common time duration. In response to determining the allocation, the base station 120 communicates the allocation to the base station 402 at 715 over an Xn interface.

With reference to FIG. 6, at 720, the base station 120 transmits a RAT-identifier-presence indicator. Similarly, at 725, the UE 110 receives the RAT-identifier-presence indicator. In transmitting the RAT-identifier-presence indicator, the base station 120 indicates downlink air interface resources used to transmit the RAT identifier, such as any combination of space-time-frequency resources (e.g., a beam direction, a bandwidth portion, a carrier frequency, a time duration). The UE 110 then uses the indicated downlink air interface resources to locate RAT identifiers. In implementations, the base station 120 indicates cross-carrier information for locating a RAT identifier. In aspects, the base station 120 transmits the RAT-identifier-presence indicator as a broadcast message, or an RRC message as further described.

With reference to FIG. 6, at 730, the base station 120 transmits a RAT identifier that indicates the allocation of the sharable air interface resource, where the base station 120 transmits the RAT identifier in conformance with the RAT-identifier-presence indicator transmitted at 720. To illustrate, the base station 120 transmits the RAT identifier using (and at) the downlink air interface resources indicated by the RAT-identifier-presence indicator. Alternatively, or additionally, the base station 402 transmits the RAT identifier (not illustrated). Similarly, at 735, the UE 110 receives the RAT identifier in conformance with the RAT-identifier-presence indicator received at (e.g., using the indicated downlink air interface resources). The base station 120 indicates, using the RAT identifier, an allocation determined at 710, such as an assigned RAT for the allocation, a duration, a carrier frequency and so forth. In aspects, the base station 120 implicitly and/or explicitly indicates the allocation as further described. Alternatively, or additionally, the base station 120 transmits the RAT identifier using a common waveform identifiable to multiple RATs, such as by using a fixed modulation and/or fixed coding scheme, and the UE blind decodes the RAT identifier At 740, the base station 120, the base station 402, and the UE 110 process the sharable air interface resource according to the time and frequency air interface allocation assigned in the RAT identifier. For instance, at a first point in time, the base station 120 communicates with the UE 110 (e.g., transmits or receives signals) using a sharable carrier frequency (e.g., sharable air interface resource 602). At a second point in time, the base station 402 communicates with the UE 110 using the sharable carrier frequency. In other words, the base station 120 stops using the sharable carrier frequency at the second point in time to avoid collisions and/or contentions with transmissions between the second base station 402 and the UE 110.

In some implementations, the process iteratively repeats, as indicated at 745 with a dashed line that returns to the diagram 700 at 705 and/or at 710. To illustrate, consider an example in which the base station 402 communicates, to the base station 120, a request to reallocate and/or change the allocation of the sharable air interface resource, such as in response to identifying a high-priority communication and/or determining to transmit a large quantity of user-plane data to the UE 110. In response to receiving the communication at 705, the base station 120 reallocates the sharable air interface resource and updates the RAT identifier and/or the RAT-identifier-presence indicator. As another example, at 710, the base station 120 determines to transmit a high-priority communication, and reallocates the sharable air interface resource, as further described. In some aspects, in response to the base station 120 (or the base station 402) completing a session with the UE 110, the base station 120 reallocates all of the sharable air interface resource to the base station 402 (or the base station 120, respectively).

Example Methods for RAT Identifiers

Example methods 800 and 900 are described with reference to FIGS. 8 and 9 in accordance with one or more aspects of radio access technology identifiers. The order in which the method blocks are described are not intended to be construed as a limitation, and any number of the described method blocks can be skipped or combined in any order to implement a method or an alternative method. Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively, or additionally, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

FIG. 8 illustrates an example method 800 for radio access technology identifiers. In some implementations, operations of method 800 are performed by a base station, such as base station 120, WLAN AP 160, and/or base station 402 as illustrated in FIGS. 1-7.

At 805, a base station receives, from a second base station, air interface resource prospective usage information associated with communications over a first wireless link of at least two wireless links that are implemented using different RATs. For instance, as described at 705 of FIG. 7, a base station (e.g., base station 120) receives air interface resource prospective usage information from a second base station (e.g., WLAN AP 160, base station 402), such as expected user-plane data volume, an expected transmission periodicity, and/or transmission priority information.

At 810, the base station allocates a sharable air interface resource between the at least two wireless links. For example, the base station (e.g., base station 120) determines an allocation of a sharable air interface resource (e.g., carrier frequency 424) between the at least two wireless links (e.g., wireless link 130, wireless link 106, wireless link 410). To illustrate, and as described at 710 of FIG. 7, the base station determines an allocation of a sharable carrier frequency, a portion of the sharable frequency band, a particular start time with a particular time duration, a portion of the particular time duration, and so forth, between a first wireless link using a first RAT implemented by the base station 120 and a second wireless link using a second RAT implemented by the base station 402 and/or the WLAN AP 160. In aspects, the base station 120 allocates the sharable carrier frequency to the first wireless link that uses the first RAT, such as by allocating the sharable carrier frequency to the first wireless link during a first time duration with a first start time, and additionally allocating the sharable carrier frequency to the second wireless link implemented by the second RAT during a second time duration with a second start time.

At 815, the base station transmits a RAT-identifier-presence indicator that communicates a presence of a RAT identifier by indicating one or more downlink air interface resources used to transmit the RAT identifier. For example, the base station (e.g., base station 120) transmits the RAT-identifier-presence indicator (e.g., RAT-identifier-presence indicator 512) to indicate a presence of the RAT identifier (e.g., RAT identifier 612) as described at 720 of FIG. 7. The base station transmits the RAT-identifier-presence indicator by broadcasting the schedule in a broadcast message and/or by transmitting the schedule in an RRC message. The RAT identifier indicates the allocation of the sharable air interface resource, and the RAT-identifier-presence indicator provides one or more downlink air interface resources (e.g., RAT identifier beam direction 514, RAT identifier bandwidth portion 516, RAT identifier carrier frequency 518, RAT identifier start time 520, RAT identifier time duration 522) that a UE uses (e.g., UE 110) to locate the RAT identifier as further described. Accordingly, in aspects the base station 120 indicates, using the RAT-identifier-presence indicator, the presence of the RAT identifier by including at least one of: an indication of a RAT-identifier beam direction; an indication of a RAT-identifier bandwidth portion; an indication of a RAT-identifier carrier frequency; an indication of a RAT-identifier start time, or an indication of a RAT-identifier time duration.

At 820, the base station transmits the RAT identifier using the one or more downlink air interface resources indicated by the RAT-identifier-presence indicator. For example, as described at 730 of FIG. 7, the base station (e.g., base station 120) transmits the RAT identifier (e.g., RAT identifier 612) using the RAT-identifier-presence indicator (e.g., RAT-identifier-presence indicator 512). In aspects, the base station transmits the RAT identifier using a waveform with a fixed coding scheme and fixed modulation scheme, where each of the at least two RATs support the waveform.

In transmitting the RAT identifier, the base station indicates one or more characteristics of the sharable air interface resource, such as by including, in the RAT identifier, an indication of an assigned-RAT start time, an indication of an assigned-RAT time duration, an indication of an assigned-RAT-frequency partition, an indication of an assigned-RAT-carrier-frequency, or an indication of a timing relation as described with reference to FIG. 6. Alternatively or additionally, the base station transmits a second indication that conveys a content configuration of the RAT identifier, such as a first content configuration that includes an assigned- RAT start time indication and an assigned-RAT-time duration indication, a second content configuration that include an assigned-RAT-carrier-frequency, and so forth. In some implementations, the base station indicates cross-carrier information, such as by transmitting the RAT identifier using a second carrier frequency that is different from an assigned-RAT-carrier-frequency indicated by the RAT identifier. At times, when the sharable air interface resource includes a particular start time with a particular time duration, the base station transmits the RAT identifier at a beginning of the time duration (e.g., at the start time) to implicitly indicate the start time of the allocation to the assigned RAT.

At 825, the base station communicates over a second wireless link of the at least two wireless links using the sharable air interface resource according to the allocation. For instance, the base station (e.g., base station 120) communicates with a UE over a second wireless link of the at least two wireless links (e.g., wireless link 130, wireless link 106, wireless link 410) using the sharable air interface resource (e.g., carrier frequency 424) according to the allocation as described at 740 of FIG. 7. To illustrate, at a first point in time, the base station 120 communicates with the UE 110 (e.g., transmits or receives signals) using the sharable air interface resource, and stops using the sharable air interface resource at the second point in time allocated to a second RAT implemented by another base station (e.g., base station 402, WLAN AP 160).

In various implementations, the method repeats as indicated at 830. For instance, the base station 120 sometimes reallocates the sharable air interface resource between the at least two RATs, such as based on communications between multiple base stations as described at 705 of FIG. 7. To illustrate, the base station receives a request form the second base station to reallocate the sharable air interface resource. The base station 120 updates the RAT identifier to indicate the reallocation of the sharable air interface resource and transmits the updated RAT identifier based on the RAT-identifier-presence indicator transmitted at 810 and/or transmits the updated RAT identifier using an updated RAT-identifier-presence indicator as described with reference to FIG. 6. For instance, assume the base station 120 utilizes a first downlink air interface resource to transmit a RAT identifier, and indicates the first downlink air interface resource in the RAT-identifier-presence indicator. In some aspects, the base station 120 identifies a second downlink air interface resource that is different from the first downlink air interface resource, and updates the RAT-identifier-presence indicator to replace the first downlink air interface resource with the second downlink air interface resource. The base station 120 then transmits the updated RAT-identifier-presence indicator to indicate the second downlink air interface resource, and also transmits the RAT identifier using the second downlink air interface resource indicated by the updated RAT-identifier-presence indicator.

In reallocating the sharable air interface resource, the base station sometimes determines a second allocation that apportions, between the at least two wireless links, at least a second sharable air interface resource that is different from the first sharable air interface resource allocated at 810. The base station then updates the RAT identifier to indicate the second allocation.

FIG. 9 illustrates an example method 900 for radio access technology identifiers. In some implementations, operations of method 900 are performed by a user equipment, such as UE 110 of FIG. 1.

At 905, a UE receives, from a base station, a radio access technology-identifier-presence indicator (RAT-identifierpresence indicator) that indicates a presence of a RAT identifier by indicating one or more downlink air interface resources used to transmit the RAT identifier. For example, the UE (e.g., UE 110) receives the RAT-identifier-presence indicator (e.g., RAT-identifier-presence indicator 512) from a base station (e.g., base station 120) that implements a first RAT as described at 725 of FIG. 7. In some aspects, the UE 110 receives the RAT-identifier-presence indicator in a broadcast message, while in other aspects, the UE receives the RAT-identifier-presence indicator in a layer 3 radio resource control (RRC) message. In aspects, the RAT identifier indicates an allocation of a sharable air interface resource between the first RAT and a second RAT implemented by a second base station (e.g., base station 402).

At 910, the UE receives the RAT identifier according to the one or more downlink air interface resources indicated by the RAT-identifier-presence indicator. For example, the UE (e.g., UE 110) receives the RAT identifier (e.g., RAT identifier 612) using the downlink air interface resources (e.g., RAT identifier beam direction 514, RAT identifier bandwidth portion 516, RAT identifier carrier frequency 518, RAT identifier start time 520, RAT identifier time duration 522) indicated by the RAT-identifier-presence indicator (e.g., RAT-identifier-presence indicator 512) as described at 735 of FIG. 7. In aspects, the UE 110 blind decodes the RAT identifier using a waveform with a fixed coding scheme and fixed modulation scheme. Alternatively, or additionally, the UE receives an indication that conveys a content configuration of the RAT identifier. At times, such as when the sharable air interface resource includes a particular time duration at a particular start time, the UE 110 receives the RAT at a beginning of the time duration and implicitly identifies the time duration as an allocated air interface resource.

At 915, the UE identifies an allocation of a sharable air interface resource from the RAT identifier, where the allocation of the sharable air interface resource apportions the sharable air interface between the at least two wireless links. For example, as described with reference to FIG. 5 and at 735 of FIG. 7, the UE (e.g., UE 110) determines, from the RAT identifier, one or more characteristics of the sharable air interface resource, such as: an assigned-RAT start time, an assigned-RAT time duration, an assigned-RAT-frequency partition, an assigned-RAT-carrier-frequency, or a timing relation. In some implementations, the UE identifies cross-carrier allocations from the RAT identifier. To illustrate, the UE 110 receives the RAT identifier using a second carrier frequency that is different from an assigned-RAT-carrier-frequency indicated by the RAT identifier. In aspects, the UE identifies the allocation using explicit and/or implicit information from the RAT identifier.

At 920, the UE communicates over the at least two wireless links by processing the sharable air interface resource according to the allocation. For example, the UE (e.g., UE 110) communicates over a first wireless link using a first RAT and the sharable air interface resource (e.g., carrier frequency 424), and over the second wireless link using a second RAT and the sharable air interface resource, according to the allocation as described at 740 of FIG. 7.

In various implementations, the method repeats as indicated at 925. For instance, the base station 120 sometimes reallocates the sharable air interface resource and updates the RAT identifier to indicate the reallocation and/or transmits an updated RAT-identifier-presence indicator. The UE 110 receives the updated RAT identifier (and/or the updated RAT-identifier-presence indicator) that indicates a reallocation of the sharable air interface resource and processes the sharable air interface resource according to the reallocation indicated by the updated RAT identifier.

Although aspects of radio access technology identifiers have been described in language specific to features and/or methods, the subject of the appended claims is not necessarily limited to the specific features or methods described. Rather, the specific features and methods are disclosed as example implementations of radio access technology identifiers, and other equivalent features and methods are intended to be within the scope of the appended claims. Further, various different aspects are described, and it is to be appreciated that each described aspect can be implemented independently or in connection with one or more other described aspects.

In the following, several examples are described:

Example 1: A method performed by a first base station for communicating an allocation of a sharable air interface resource between at least two wireless links that use different Radio Access Technologies, RATs, the method comprising: receiving, from a second base station, air interface resource prospective usage information associated with communications over a first wireless link of the at least two wireless links; allocating the sharable air interface resource between the at least two wireless links that use different RATs by analyzing the air interface resource prospective usage information; transmitting a RAT-identifier-presence indicator that communicates a presence of a RAT identifier by indicating one or more downlink air interface resources used to transmit the RAT identifier, the RAT identifier indicating the allocation of the sharable air interface resource between the at least two wireless links; and transmitting the RAT identifier using the one or more downlink air interface resources indicated by the RAT-identifier-presence indicator.

Example 2: The method as recited in example 1, wherein transmitting the RAT-identifier-presence indicator further comprises: broadcasting the RAT-identifier-presence indicator in a broadcast message; or transmitting at least a portion of the RAT-identifier-presence indicator in a radio resource control, RRC, message.

Example 3: The method as recited in example 1 or example 2, wherein indicating the one or more downlink air interface resources used to transmit the RAT identifier further comprises indicating one or more of: a RAT identifier beam direction; a RAT identifier bandwidth portion; a RAT identifier carrier frequency; a RAT identifier start time; or a RAT identifier time duration.

Example 4: The method as recited in any one of the preceding examples, wherein transmitting the RAT identifier further comprises: transmitting the RAT identifier using a waveform with a fixed coding scheme and fixed modulation scheme that is supported by each of the at least two RATs.

Example 5: The method as recited any one of the preceding examples, the method further comprising: indicating, using the RAT identifier, one or more characteristics of the sharable air interface resource, the one or more characteristics comprising at least one of: an assigned RAT start time; an assigned RAT time duration; an assigned RAT frequency partition; or an assigned RAT carrier frequency.

Example 6: The method as recited in example 5, wherein transmitting the RAT identifier further comprises: transmitting the RAT identifier using a second carrier frequency that is different from the assigned-RAT carrier frequency.

Example 7: The method as recited in any one of the preceding examples, the method further comprising: transmitting a second indication that conveys a content configuration of the RAT identifier.

Example 8: The method as recited in any one of the preceding examples, wherein the sharable air interface resource includes a time duration defined by an air interface resource partitioning scheme of a first RAT of the different RATs, and wherein transmitting the RAT identifier further comprises: transmitting the RAT identifier at a beginning of the time duration defined by the air interface resource partitioning scheme.

Example 9: The method as recited in any one of the preceding examples, further comprising: reallocating the sharable air interface resource between the at least two RATs; updating the RAT identifier to indicate the reallocation of the sharable air interface resource; and transmitting the updated RAT identifier to indicate the reallocated sharable air interface resource.

Example 10: The method as recited in example 9, wherein the allocation is a first allocation, the sharable air interface resource is a first sharable air interface resource, and updating the RAT identifier to indicate the reallocation of the sharable air interface resource comprises: determining a second allocation that apportions at least a second sharable air interface resource that is different from the first sharable air interface resource between the at least two wireless links; and updating the RAT identifier to indicate the second allocation Example 11: The method as recited in example 9 or example 10, further comprising: receiving, from the second base station, a request to reallocate the sharable air interface resource.

Example 12: The method as recited in any one of examples 9 to 11, wherein the one or more downlink air interface resources include a first downlink air interface resource, and the method further comprises: determining a second downlink air interface resource that is different from the first downlink air interface resource; updating the RAT-identifier-presence indicator to replace the first downlink air interface resource with the second downlink air interface resource; transmitting the updated RAT-identifier presence indicator; and transmitting the updated RAT identifier using the second downlink air interface resource indicated by the updated RAT-identifier-presence indicator.

Example 13: The method as recited in any one of examples 1 to 8, wherein the one or more downlink air interface resources include a first downlink air interface resource, and the method further comprises: determining a second downlink air interface resource that is different from the first downlink air interface resource; updating the RAT-identifier-presence indicator to replace the first downlink air interface resource with the second downlink air interface resource; transmitting the updated RAT-identifier presence indicator; and transmitting the RAT identifier using the second downlink air interface resource indicated by the updated RAT-identifier-presence indicator.

Example 14: The method as recited in any one of the preceding examples further comprising: communicating with a user equipment, UE, over a second wireless link of the at least two wireless links using the sharable air interface resource according to the allocation.

Example 15: A method performed by a user equipment, UE, for identifying an allocation of a sharable air interface resource between at least two wireless links that are implemented by different Radio Access Technologies, RATs, the method comprising: receiving, from a base station, a radio access technology-identifier-presence indicator, RAT-identifier-presence indicator, that indicates a presence of a RAT identifier by indicating one or more downlink air interface resources used to transmit a RAT identifier, the RAT identifier indicating the allocation of the sharable air interface resource between the at least two wireless links; receiving the RAT identifier according to the one or more downlink air interface resources indicated by the RAT-identifier-presence indicator; identifying the allocation of the sharable air interface resource from the RAT identifier; and communicating over the at least two wireless links by processing the sharable air interface resource according to the allocation.

Example 16: The method as recited in example 15, wherein receiving the RAT-identifier-presence indicator further comprises: receiving the RAT-identifier-presence indicator in a broadcast message; or receiving at least a portion of the RAT-identifier-presence indicator in a layer 3 radio resource control, RRC, message.

Example 17: The method as recited in example 15 or example 16, further comprising: determining, as the one or more downlink air interface resources and from the RAT-identifier-presence indicator, at least one of: a RAT identifier beam direction; a RAT identifier bandwidth portion; a RAT identifier carrier frequency; a RAT identifier start time; or a RAT identifier time duration.

Example 18: The method as recited in any one of examples 15 to 17, wherein receiving the RAT identifier further comprises: blind decoding the RAT identifier using a waveform with a fixed coding scheme and fixed modulation scheme that is supported by each of the at least two RATs.

Example 19: The method as recited any one of examples 15 to 18, the method further comprising: determining, from the RAT identifier, one or more characteristics of the sharable air interface resource, the one or more characteristics comprising at least one of: an assigned RAT start time; an assigned RAT time duration; an assigned RAT frequency partition; or an assigned RAT carrier frequency.

Example 20: The method as recited in example 19, wherein receiving the RAT identifier further comprises: receiving the RAT identifier using a second carrier frequency that is different from the assigned RAT carrier frequency.

Example 21: The method as recited in any one of examples 15 to 20, the method further comprising: receiving a second indication that conveys a content configuration of the RAT identifier.

Example 22: The method as recited in any one of examples 15 to 21, wherein the sharable air interface resource includes a time duration defined by an air interface resource partitioning scheme of a first RAT of the different RATs, and wherein receiving the RAT identifier further comprises: receiving the RAT identifier at a beginning of the time duration defined by the air interface resource partitioning scheme.

Example 23: The method as recited in any one of examples 15 to 22, further comprising: receiving an updated RAT identifier that indicates a reallocation of the sharable air interface resource; and processing the sharable air interface resource according to the reallocation indicated by the updated RAT identifier.

Example 24: The method as recited in example 23, further comprising: receiving an updated RAT-identifier-presence indicator that indicates a second downlink air interface resource that is different from the one or more downlink air interface resources; and receiving the updated RAT identifier using the second downlink air interface resource.

Example 25: The method as recited in any one of examples 15 to 22, further comprising: receiving an updated RAT-identifier-presence indicator that indicates a second downlink air interface resource that is different from the one or more downlink air interface resources; and receiving the RAT identifier using the second downlink air interface resource.

Example 26: The method as recited in any one of examples 15 to 25, further comprising: communicating over the at least two wireless links by processing the sharable air interface resource according to the allocation.

Example 27: A base station apparatus comprising: at least one wireless transceiver; a processor; and computer-readable storage media comprising instructions, responsive to execution by the processor, for directing the base station apparatus to perform any one of the methods recited in examples 1 to 14 using the at least one wireless transceiver.

Example 28: A user equipment comprising: at least one wireless transceiver; a processor; and computer-readable storage media comprising instructions, responsive to execution by the processor, for directing the user equipment to perform any one of the methods recited in examples 15 to 26.

Example 29: A computer-readable storage media comprising instructions that, responsive to execution by a processor, cause a method as recited in any one of examples 1 to 26 to be performed.

The invention claimed is:

1. A method performed by a user equipment, UE, for identifying an allocation of a shareable air interface resource between at least two wireless links that are implemented by at least two different Radio Access Technologies (RATs) the method comprising:

receiving, from a base station, a radio access technology-identifier-presence indicator (RAT-identifier-presence indicator) that indicates a presence of a RAT identifier by indicating one or more downlink air interface resources used to transmit the RAT identifier, the RAT identifier indicating the allocation of the shareable air interface resource between the at least two different RATs;

receiving the RAT identifier according to the one or more downlink air interface resources indicated by the RAT-identifier-presence indicator;

identifying, from the RAT identifier, the allocation of the shareable air interface resource between the at least two different RATs; and communicating over the at least two wireless links by processing the shareable air interface resource using the at least two different RATs according to the allocation.

2. The method as recited in claim 1, wherein receiving the RAT-identifier-presence indicator further comprises:

receiving the RAT-identifier-presence indicator in a broadcast message; or receiving at least a portion of the RAT-identifier-presence indicator in a layer 3 radio resource control (RRC) message.

3. The method as recited in claim 1, wherein receiving the RAT identifier further comprises:

blind decoding the RAT identifier using a waveform with a fixed coding scheme and fixed modulation scheme that is supported by each of the at least two different RATs.

4. The method as recited in claim 1, wherein one or more characteristics of the shareable air interface resource comprise at least one of:

an assigned RAT start time;

an assigned RAT time duration;

an assigned RAT frequency partition; or an assigned RAT carrier frequency.

5. The method as recited in claim 1, wherein the shareable air interface resource includes a time duration defined by an air interface resource partitioning scheme of a first RAT of the at least two different RATs, and wherein receiving the RAT identifier further comprises:

receiving the RAT identifier at a beginning of the time duration defined by the air interface resource partitioning scheme of the first RAT.

6. The method as recited in claim 1 further comprising:

receiving an updated RAT identifier that indicates a reallocation of the shareable air interface resource from a first RAT of the at least two different RATs to a second RAT of the at least two different RATs; and processing the shareable air interface resource according to the reallocation indicated by the updated RAT identifier.

7. A method performed by a first base station for communicating an allocation of a shareable air interface resource between at least two wireless links that use at least two different Radio Access Technologies (RATs) the method comprising:

receiving, from a second base station, air interface resource prospective usage information associated with communications over a first wireless link of the at least two wireless links;

allocating the shareable air interface resource between the at least two wireless links and the at least two different RATs by analyzing the air interface resource prospective usage information;

transmitting a RAT-identifier-presence indicator that communicates a presence of a RAT identifier by indicating one or more downlink air interface resources used to transmit the RAT identifier, the RAT identifier indicating the allocation of the shareable air interface resource between the at least two different RATs; and transmitting the RAT identifier using the one or more downlink air interface resources indicated by the RAT-identifier-presence indicator.

8. The method as recited in claim 7, wherein transmitting the RAT-identifier-presence indicator further comprises:

broadcasting the RAT-identifier-presence indicator in a broadcast message; or transmitting at least a portion of the RAT-identifier-presence indicator in a radio resource control (RRC) message.

9. The method as recited in claim 7, wherein transmitting the RAT identifier further comprises:

transmitting the RAT identifier using a waveform with a fixed coding scheme and fixed modulation scheme that is supported by each of the at least two different RATs.

10. The method as recited in claim 7, the method further comprising:

indicating, using the RAT identifier, one or more characteristics of the shareable air interface resource, the one or more characteristics comprising at least one of:

an assigned RAT start time;

an assigned RAT time duration;

an assigned RAT frequency partition; or an assigned RAT carrier frequency.

11. The method as recited in claim 7, wherein indicating the one or more downlink air interface resources used to transmit the RAT identifier further comprises indicating one or more of:

a RAT identifier beam direction;

a RAT identifier bandwidth portion;

a RAT identifier carrier frequency;

a RAT identifier start time; or a RAT identifier time duration.

12. The method as recited in claim 7, wherein the shareable air interface resource includes a time duration defined by an air interface resource partitioning scheme of a first RAT of the at least two different RATs, and wherein transmitting the RAT identifier further comprises:

transmitting the RAT identifier at a beginning of the time duration defined by the air interface resource partitioning scheme of the first RAT.

13. The method as recited in claim 7, further comprising:

reallocating the shareable air interface resource from a first RAT of the at least two different RATs to a second RAT of the at least two different RATs;

updating the RAT identifier to indicate the reallocation of the shareable air interface resource from the first RAT to the second RAT; and transmitting the updated RAT identifier to indicate the reallocated shareable air interface resource.

14. The method as recited in claim 13, wherein reallocating the shareable air interface resource from the first RAT of the at least two different RATs to the second RAT of the at least two different RATs further comprises:

receiving, from the second base station, a request to reallocate the shareable air interface resource from the first RAT to the second RAT; and performing the reallocating based on receiving the request.

15. An apparatus comprising:

at least one wireless transceiver;

a processor; and computer-readable storage media comprising instructions executable by the processor to configure the apparatus to:

receive, using the at least one wireless transceiver, a radio access technology-identifier-presence indicator (RAT-identifier-presence indicator) that indicates a presence of a Radio Access Technology (RAT) identifier by indicating one or more downlink air interface resources used to transmit the RAT identifier, the RAT identifier indicating an allocation of shareable air interface resource between at least two different RATs;

receive the RAT identifier according to the one or more downlink air interface resources indicated by the RAT-identifier-presence indicator;

identify, from the RAT identifier, the allocation of the shareable air interface resource between the at least two different RATs; and communicate over at least two wireless links by processing the shareable air interface resource using the at least two different RATs according to the allocation.

16. The apparatus of claim 15, wherein the instructions for the reception of the RAT-identifier-presence indicator are further executable to configure the apparatus to:

receive the RAT-identifier-presence indicator in a broadcast message; or receive at least a portion of the RAT-identifier-presence indicator in a layer 3 radio resource control (RRC) message.

17. The apparatus of claim 15, wherein the instructions for the reception of the RAT identifier are further executable to configure the apparatus to:

blind decode the RAT identifier using a waveform with a fixed coding scheme and fixed modulation scheme that is supported by each of the at least two different RATs.

18. The apparatus of claim 15, wherein one or more characteristics of the shareable air interface resource comprise at least one of:

an assigned RAT start time;

an assigned RAT time duration;

an assigned RAT frequency partition; or an assigned RAT carrier frequency.

19. The apparatus of claim 15, wherein the shareable air interface resource includes a time duration defined by an air interface resource partitioning scheme of a first RAT of the at least two different RATs, and wherein the instructions for the reception of the RAT identifier are further executable to configure the apparatus to:

receive the RAT identifier at a beginning of the time duration defined by the air interface resource partitioning scheme of the first RAT.

20. The apparatus of claim 15, the instructions further executable to configure the apparatus to:

receive an updated RAT identifier that indicates a reallocation of the shareable air interface resource from a first RAT of the at least two different RATs to a second RAT of the at least two different RATs; and process the shareable air interface resource according to the reallocation indicated by the updated RAT identifier.

* * * * *